US012610130B2

(12) United States Patent
Chen et al.

(10) Patent No.: US 12,610,130 B2
(45) Date of Patent: Apr. 21, 2026

(54) METHOD AND APPARATUS FOR DISPLAYING CAPTURED PICTURE, TERMINAL, AND STORAGE MEDIUM

(71) Applicant: Tencent Technology (Shenzhen) Company Limited, Shenzhen (CN)

(72) Inventors: Zhixing Chen, Shenzhen (CN); Lei Nie, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 234 days.

(21) Appl. No.: 17/950,973

(22) Filed: Sep. 22, 2022

(65) Prior Publication Data

US 2023/0020379 A1     Jan. 19, 2023

Related U.S. Application Data

(63) Continuation of application No. PCT/CN2021/116097, filed on Sep. 2, 2021.

(30) Foreign Application Priority Data

Sep. 21, 2020     (CN) .......................... 202011000516.8

(51) Int. Cl.
*H04N 23/62*     (2023.01)
*A63F 13/00*     (2014.01)

(52) U.S. Cl.
CPC ............. *H04N 23/62* (2023.01); *A63F 13/00* (2013.01)

(58) Field of Classification Search
CPC ................................. H04N 23/62; A63F 13/00
See application file for complete search history.

(56) References Cited

U.S. PATENT DOCUMENTS

2016/0089600 A1* 3/2016 Mays, III ................ A63F 13/22
                                                                463/31
2019/0060745 A1     2/2019 He
                        (Continued)

FOREIGN PATENT DOCUMENTS

CN          103226838 A     7/2013
CN          106528020 A     3/2017
                        (Continued)

OTHER PUBLICATIONS

CN-107895399-A (Year: 2018).*
                        (Continued)

*Primary Examiner* — Twyler L Haskins
*Assistant Examiner* — Surafel Yilmakassaye
(74) *Attorney, Agent, or Firm* — Banner & Witcoff, Ltd.

(57)     ABSTRACT

Embodiments of this application disclose a method for updating a captured picture in a game application performed by a computer device. The method includes: displaying, on a graphical interface, a first captured picture of a game scene of a game application and a lens operation control in the first captured picture; and displaying a second captured picture in response to a touch operation performed by a user on the lens operation control, the second captured picture being obtained by adjusting a pose of a lens within a plane where the lens is located based on the touch operation and capturing a picture of the game scene of the game application with the pose-adjusted lens, and the plane where the lens is located being a plane that is perpendicular to an orientation of the lens.

20 Claims, 18 Drawing Sheets

---

Display, on a graphical interface on a terminal screen, a first captured picture of a game scene in a capturing mode in a game application, and display a lens operation control in the first captured picture      S201

Display a second captured picture in response to a touch operation performed by a user on the lens operation control, the second captured picture being obtained by adjusting a pose of a lens within a plane where the lens is located based on the touch operation and capturing a picture of the game scene in a game scene space with the pose-adjusted lens      S202

(56) References Cited

U.S. PATENT DOCUMENTS

2019/0118078 A1* 4/2019 Li ...................... A63F 13/2145
2019/0299091 A1* 10/2019 Wu .................... G06F 3/04815

FOREIGN PATENT DOCUMENTS

| CN | 106780674 | A | | 5/2017 | |
| CN | 107213636 | A | | 9/2017 | |
| CN | 107519644 | A | | 12/2017 | |
| CN | 107617213 | A | | 1/2018 | |
| CN | 107890664 | A | | 4/2018 | |
| CN | 107895399 | A | * | 4/2018 | |
| CN | 110180183 | A | | 8/2019 | |
| CN | 110575671 | A | | 12/2019 | |
| CN | 111603770 | A | | 9/2020 | |
| CN | 112118358 | A | | 12/2020 | |
| CN | 110251936 | B | * | 12/2022 | ........... A63F 13/426 |

OTHER PUBLICATIONS

A Comprehensive Viewing Angle Switching Method, Device and Terminal Apparatus and Storage Medium (Year: 2018).*
Tencent Technology, ISR, PCT/CN2021/116097, Dec. 1, 2021, 3 pgs.
Tencent Technology, WO, PCT/CN2021/116097, Dec. 1, 2021, 5 pgs.
Tencent Technology, IPRP, PCT/CN2021/116097, Mar. 21, 2023, 6 pgs.

* cited by examiner

Display, on a graphical interface on a terminal screen, a first captured picture of a game scene in a capturing mode in a game application, and display a lens operation control in the first captured picture    S201

Display a second captured picture in response to a touch operation performed by a user on the lens operation control, the second captured picture being obtained by adjusting a pose of a lens within a plane where the lens is located based on the touch operation and capturing a picture of the game scene in a game scene space with the pose-adjusted lens    S202

FIG. 2

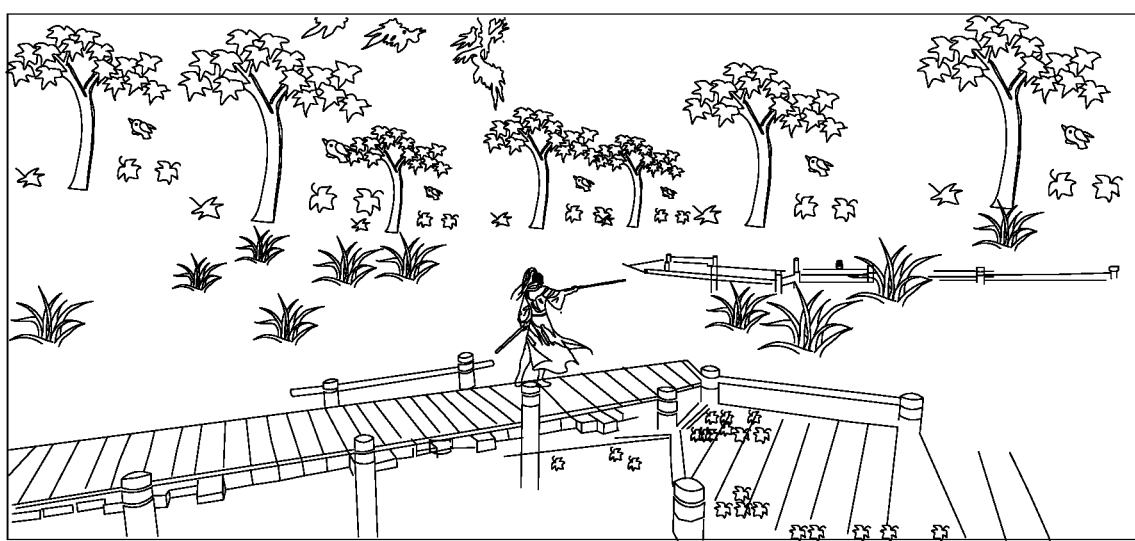

FIG. 3A

Perform a first swipe
operation in a
translation operation
subregion

5012

5011

502

Perform a second
swipe operation in a
rotation operation
subregion

Perform a third swipe operation in a lens translation subregion

Perform a fourth swipe operation in a lens rotation subregion

Rotate the lens

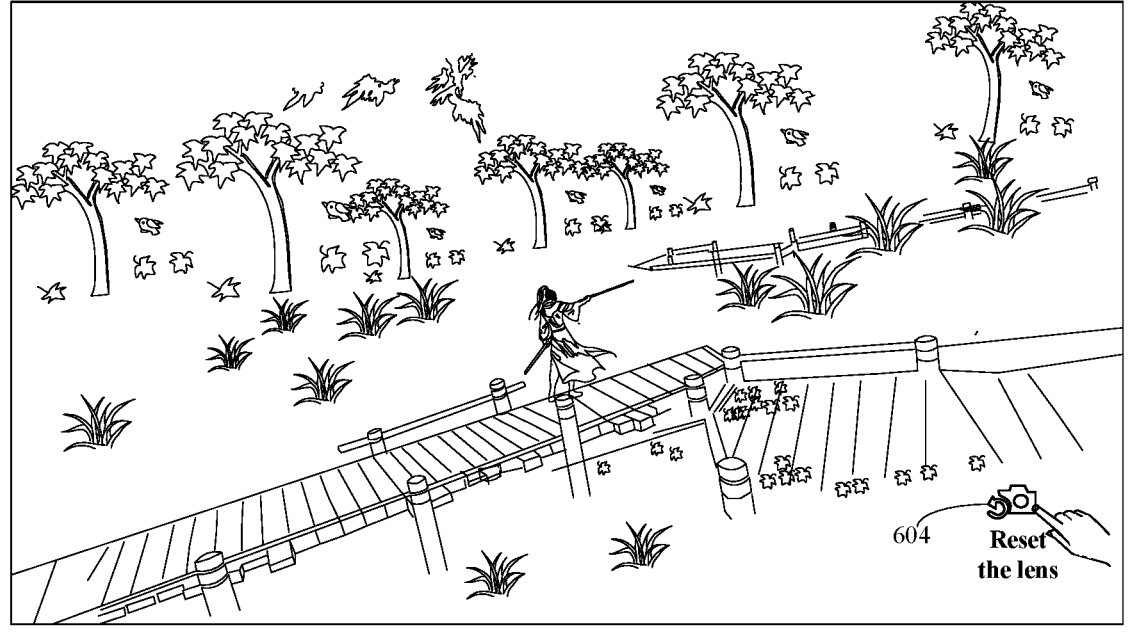
Reset the lens
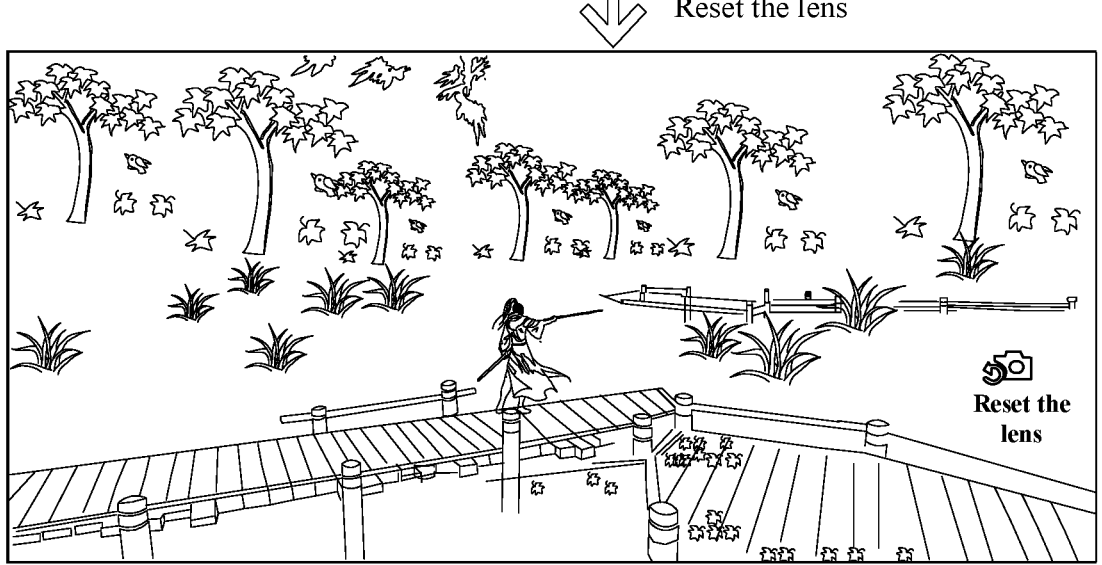
FIG. 6C

Display, on a graphical interface on a terminal screen, a first captured picture of a game scene in a capturing mode in a game application, and display a lens operation control in the first captured picture, the lens operation control including a translation operation subregion, a rotation operation subregion, and an operation trigger control ⟶ S701

Adjust, when a second swipe operation is performed on the operation trigger control in the rotation operation subregion, a pose of a lens according to the second swipe operation and a plane where the lens is located ⟶ S702

Adjust, when a first swipe operation is performed on the operation trigger control in the translation operation subregion, the pose of the lens within the plane where the lens is located according to the first swipe operation ⟶ S703

Capture a picture of the game scene with the pose-adjusted lens, to obtain a second captured picture and display the second captured picture on the terminal screen ⟶ S704

FIG. 7

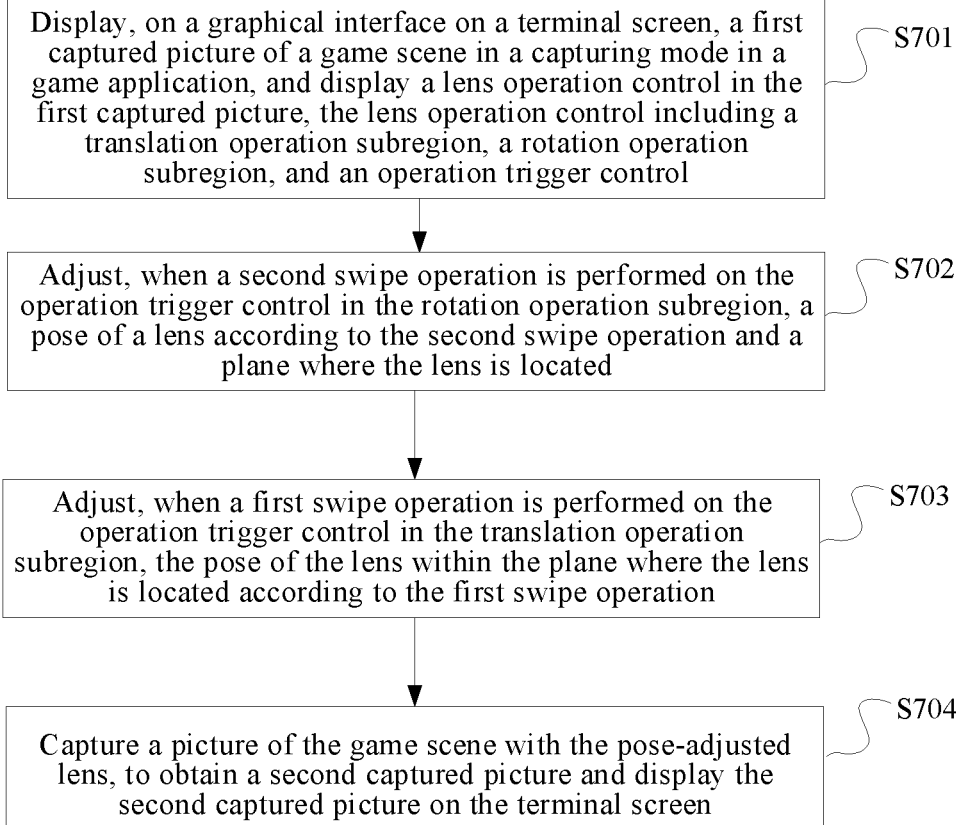

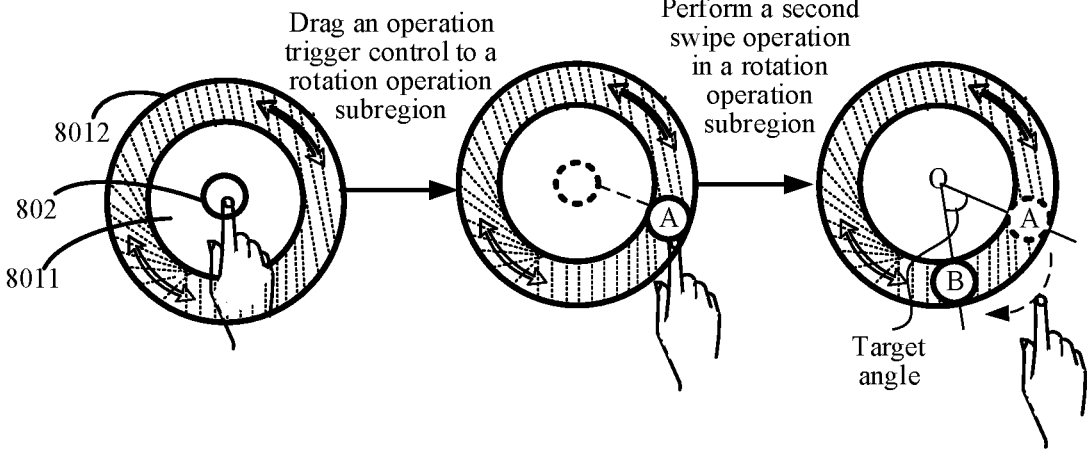

FIG. 8A

Perform a first swipe operation on an operation trigger control in a translation operation subregion

METHOD AND APPARATUS FOR DISPLAYING CAPTURED PICTURE, TERMINAL, AND STORAGE MEDIUM

CROSS-REFERENCE TO RELATED APPLICATIONS

This application is a continuation application of PCT Patent Application No. PCT/CN2021/116097, entitled "CAPTURED IMAGE DISPLAY METHOD AND APPARATUS, TERMINAL, AND STORAGE MEDIUM" filed on Sep. 2, 2021, which claims priority to Chinese Patent Application No. 202011000516.8, filed with the State Intellectual Property Office of the People's Republic of China on Sep. 21, 2020, and entitled "METHOD AND APPARATUS FOR DISPLAYING CAPTURED PICTURE, TERMINAL, AND STORAGE MEDIUM", all of which are incorporated herein by reference in their entirety.

FIELD OF THE TECHNOLOGY

This application relates to the field of computer technologies, and in particular, to a method and apparatus for displaying captured picture, a terminal, and a storage medium.

BACKGROUND OF THE DISCLOSURE

With the development of science and technology, various game developers have added a capturing mode to a game application. The capturing mode may be understood as a quick way to take a screenshot in the game application. Before the capturing mode is not developed, a player usually takes a screenshot of a game picture through a screen capture button built into the terminal and a third-party application with a screenshot function. The quality of the game pictured captured in this manner is not high. Since the development of the capturing mode, high-quality game pictures can be captured.

In the capturing mode, the player can display a plurality of captured pictures in the terminal by adjusting a pose of a lens for capturing pictures in the game. The player can capture a current captured picture by triggering the capturing button when finding a satisfactory captured picture. Therefore, in the game application, how to effectively display the captured picture has become a hot research issue nowadays.

SUMMARY

Embodiments of this application provide a method and apparatus for displaying a captured picture, a terminal, and a storage medium. In this way, different captured pictures can be displayed through a touch operation on a lens operation control, so as to take a photo at any angle in a game.

According to an aspect, an embodiment of this application provides a method for updating a captured picture in a game application, performed by a computer device, the method including:

displaying, on a graphical interface, a first captured picture of a game scene of a game application and a lens operation control in the first captured picture; and displaying a second captured picture in response to a touch operation performed by a user on the lens operation control, the second captured picture being obtained by adjusting a pose of a lens within a plane where the lens is located based on the touch operation and capturing a picture of the game scene of the game application with the pose-adjusted lens, and the plane where the lens is located being a plane that is perpendicular to an orientation of the lens.

According to an aspect, an embodiment of this application provides an apparatus for updating a captured picture in a game application, including:

a display unit, configured to display, on a graphical interface, a first captured picture of a game scene of a game application and a lens operation control in the first captured picture; and a processing unit, configured to receive a touch operation performed by a user on the lens operation control;

the display unit being further configured to display a second captured picture in response to a touch operation performed by a user on the lens operation control, the second captured picture being obtained by adjusting a pose of a lens within a plane where the lens is located based on the touch operation and capturing a picture of the game scene of the game application with the pose-adjusted lens, and the plane where the lens is located being a plane that is perpendicular to an orientation of the lens.

According to an aspect, an embodiment of this application provides a terminal, including:

a processor, adapted to execute one or more instructions; and a computer-readable storage medium, storing one or more instructions, the one or more instructions being adapted to be loaded and executed by the processor to implement the method for updating a captured picture in a game application.

According to an aspect, an embodiment of this application provides a computer-readable storage medium, the computer-readable storage medium storing computer program instructions, the computer program instructions, when executed by the processor, are used for performing the method for updating a captured picture in a game application.

According to one aspect, an embodiment of this application provides a computer program product or a computer program, the computer program product or the computer program including computer instructions, the computer instructions being stored in a computer-readable storage medium. A processor of a terminal reads the computer instructions from the computer storage medium, and the processor executes the computer instructions to perform the method for displaying the captured image.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

FIG. 2 is a schematic flowchart of a method for displaying a captured picture according to an embodiment of this application.

FIG. 3A is a schematic diagram of displaying a first captured picture on a terminal screen according to an embodiment of this application.

FIG. 6C is still another schematic diagram of a second captured picture according to an embodiment of this application.

FIG. 7 is another schematic flowchart of a method for displaying a captured picture according to an embodiment of this application.

FIG. 8A is a schematic diagram showing determination of a target angle according to an embodiment of this application.

DESCRIPTION OF EMBODIMENTS

Technical solutions in embodiments of this application are clearly and completely described below with reference to the accompanying drawings in the embodiments of this application.

In order to attract more players, more game developers have developed capturing functions in three-dimensional (3D) mobile games, bringing players more gaming experience. The so-called 3D mobile game is a game that uses the spatial three-dimensional computing technology to realize the operation, which has three dimensions including a length, a width, and a height. In this game, players can make multi-dimensional lens adjustments. A lens may be located in a 3D game scene space, and a game picture that the player sees through a terminal is obtained by capturing a picture of a scene content in a game scene space by the lens. The multi-dimensional lens adjustment means that the lens can perform position or posture changes in various directions in the three-dimensional scene, including but not limited to translation, orbiting, rotation, and the like.

In a 3D mobile game with a capturing function, how to control the lens to perform multi-dimensional translation and rotation in a 3D scene has become the main problem to better realize the capturing function. In the conventional technology, during control of lens translation and rotation, a mode of operating the lens is to be switched between a lens translation mode (also referred to as a 2D mode) and a lens rotation mode (also referred to as a regular game mode). However, the disadvantage of this method is that translation is difficult at a long distance. A translation distance of the lens depends on a swipe distance of a finger on a terminal screen, and the terminal screen distance is limited. When it is required to translate the lens at a long distance, it is necessary to swipe the screen a plurality of times.

Figure 1A:
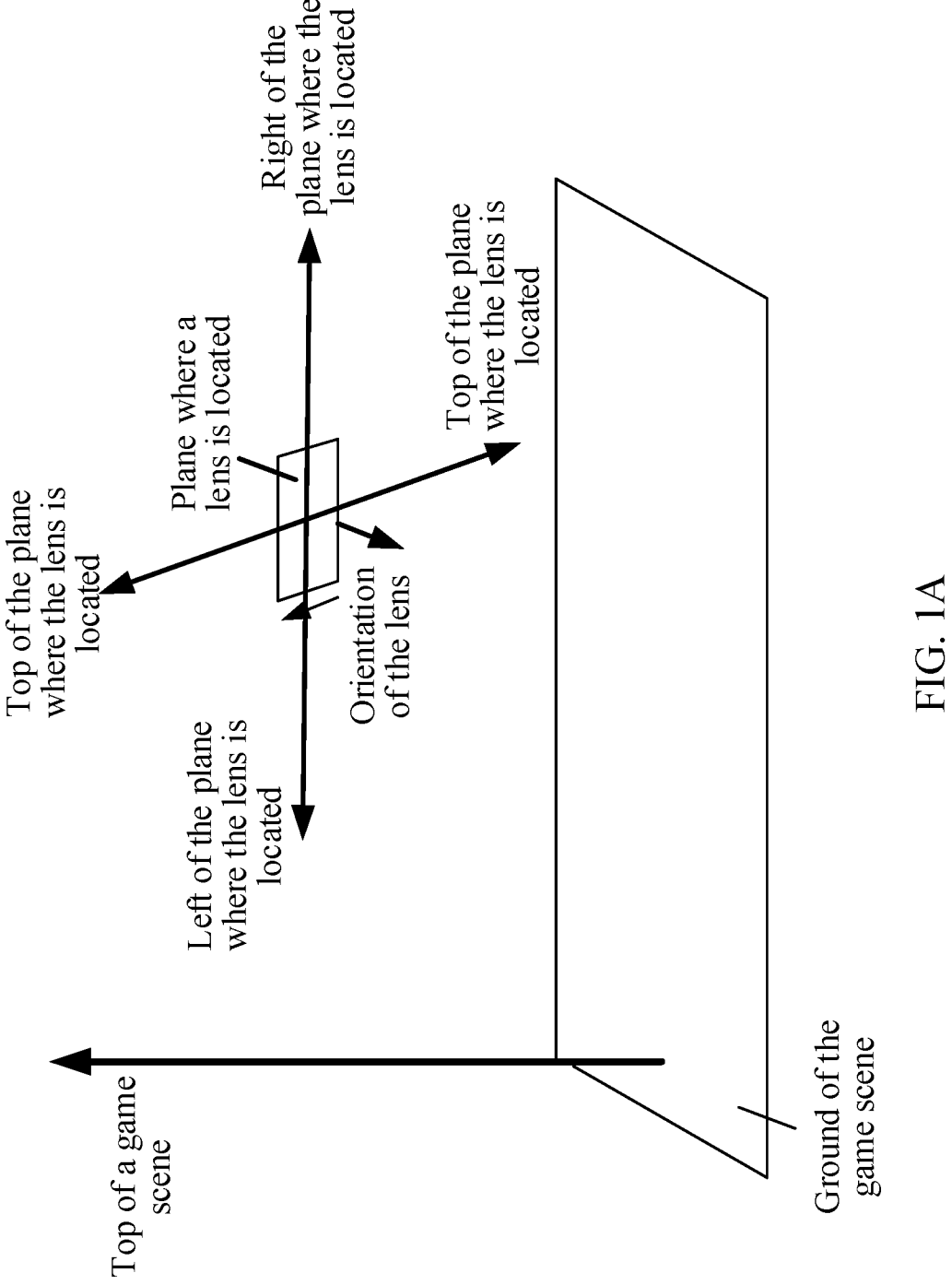
FIG. 1A is a schematic diagram of a plane in a game scene space and where a lens is located according to an embodiment of this application.

FIG. 1A is a schematic diagram of a game scene space and a plane where a lens is located according to an embodiment of this application. The lens may be located at any position in the game scene space, and the lens is configured to capture a picture of a scene content in the game scene space. A picture captured by the lens may be displayed on a terminal screen. The plane where the lens is located is a plane in the game scene space that is perpendicular to an orientation of the lens.

When the lens is translated in the game scene space, the lens is regarded as a mass point in the game scene space. No matter the lens currently faces any direction, the lens is controlled to move up and down along a vertical axis in the game scene space according to an inputted translation operation. In this way, when the lens is on the ground in the game scene space, that is, when the lens faces down, the lens is controlled to move up and down along the vertical axis in the game scene space, which may cause a situation, seen from the captured picture displayed on the terminal screen, that the lens is farther away from the ground, which is inconsistent with the perception. Alternatively, this situation may cause a direction in which a player operates the lens to be inconsistent with an actual moving direction of the lens.

Figure 1B:
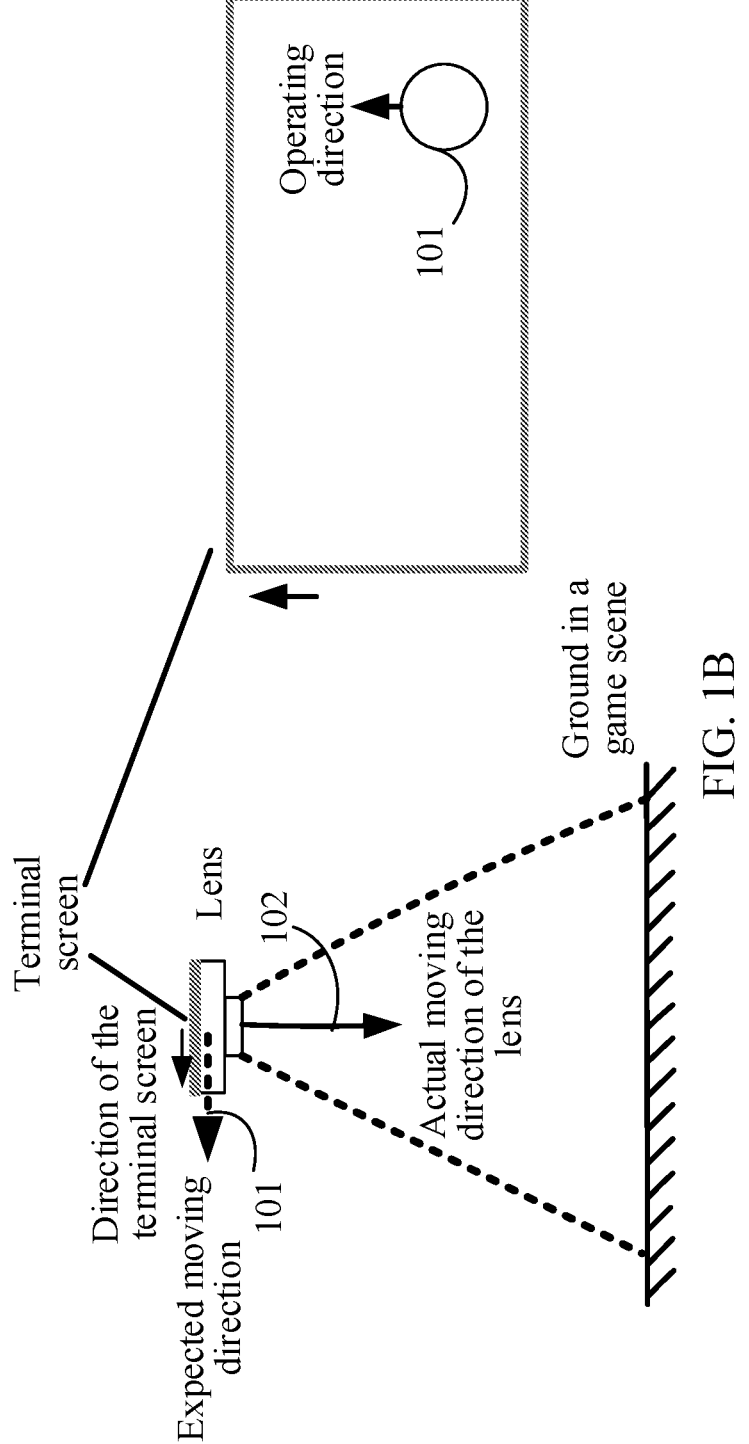
FIG. 1B is a schematic diagram of an adjustment to a lens in a game scene space according to an embodiment of this application.

For example, FIG. 1B is a schematic diagram of an adjustment to a lens in a game scene space according to an embodiment of this application. In FIG. 1B, a direction in which the player wants to adjust the lens is shown in 101, but since the adjustment to the lens by the terminal is performed in the game scene space, the actual moving direction of the lens is shown in 102, which causes the direction expected by the player to be inconsistent with the actual adjustment direction.

Figure 1C:
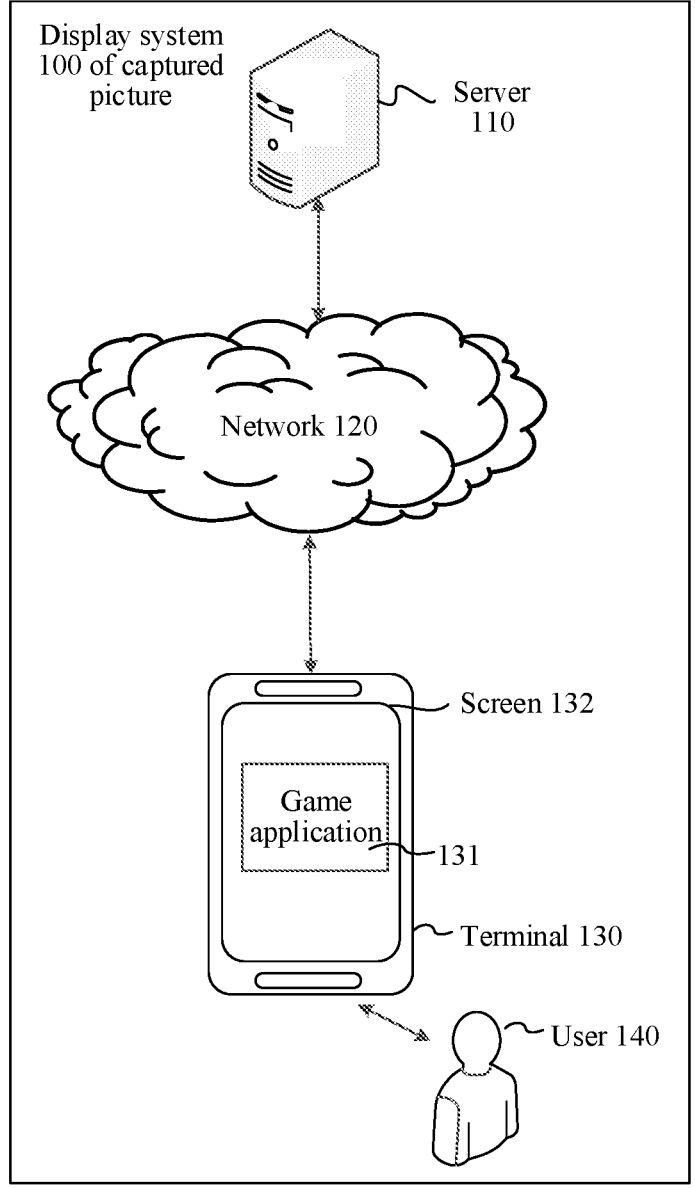
FIG. 1C is a schematic structural diagram of a display system of a captured picture according to an embodiment of this application.

Based on the above, an embodiment of this application provides a new interactive solution for realizing lens movement and rotation. FIG. 1C is a schematic structural diagram of a display system 100 of a captured picture according to an embodiment of this application. The display system 100 of the captured picture includes a server 110, a network 120, a terminal 130, and a user 140. A game application 131 is installed on the terminal 130. After the user 140 opens the game application 131, a corresponding game picture is displayed on a screen 132 of the terminal 130.

According to the method provided in the embodiment of this application, a first captured picture in a capturing mode in the game application is displayed on the terminal screen 132, and there is a lens pose adjustment region in the first captured picture. The lens pose adjustment region includes a lens operation control. In response to a touch operation performed by the user 140 on the lens operation control, the lens may be translated based on a plane where the lens is located, and/or the lens may be rotated based on the plane where the lens is located. In this way, a picture of a scene content in a game scene space is captured with the pose-adjusted lens, to obtain a second captured picture, which can ensure that a direction indicated by the user 140 through the touch operation is exactly the same as a moving direction of the lens seen by the user.

The terminal 130 may be any one or more of devices such as a smart phone, a tablet computer, a notebook computer, a desktop computer, a smart speaker, and a smart watch. The game application 131 may be any 3D game application, which includes a capturing mode.

According to the solution provided in the embodiment of this application, a translation operation and a rotation operation on the lens can be conveniently inputted through the control, and the lens can be adjusted according to the translation operation and the rotation operation based on the plane where the lens is located, thereby improving the accuracy of lens adjustment.

Based on the interactive solution for realizing lens movement and rotation, an embodiment of this application provides a method for displaying a captured picture. FIG. 2 is a schematic flowchart of a method for displaying a captured picture according to an embodiment of this application. The method for displaying a captured picture shown in FIG. 2 may be performed by a terminal, for example, the terminal 130 in FIG. 1C, and may be specifically performed by a processor of the terminal. The method for displaying a captured picture shown in FIG. 2 may include the following steps.

Step S201: Display, on a graphical interface displayed on a terminal screen, a first captured picture of a game scene in a capturing mode in a game application, and display a lens operation control in the first captured picture.

In an embodiment, when the capturing mode is triggered, the terminal displays the first captured picture on the terminal screen. The first captured picture may be obtained by capturing a picture of a scene content in a game scene space based on a current pose of a lens. FIG. 3A is a schematic diagram of displaying a first captured picture on a terminal screen according to an embodiment of this application.

In an embodiment, when the first captured picture is displayed, a lens operation control may further be displayed on a terminal screen. When a touch operation is performed on the lens operation control, a terminal adjusts a pose of a lens according to the touch operation and a plane where the lens is located.

As an exemplary implementation, the lens operation control may include a lens translation sub-control and a lens rotation sub-control. The lens translation sub-control may be a solid circle, and the lens rotation sub-control may be a hollow annulus. Both the lens translation sub-control and the lens rotation sub-control can be triggered. In some embodiments, the lens translation sub-control may be a solid circle, and the lens rotation sub-control may be a hollow annulus.

Figure 3B:
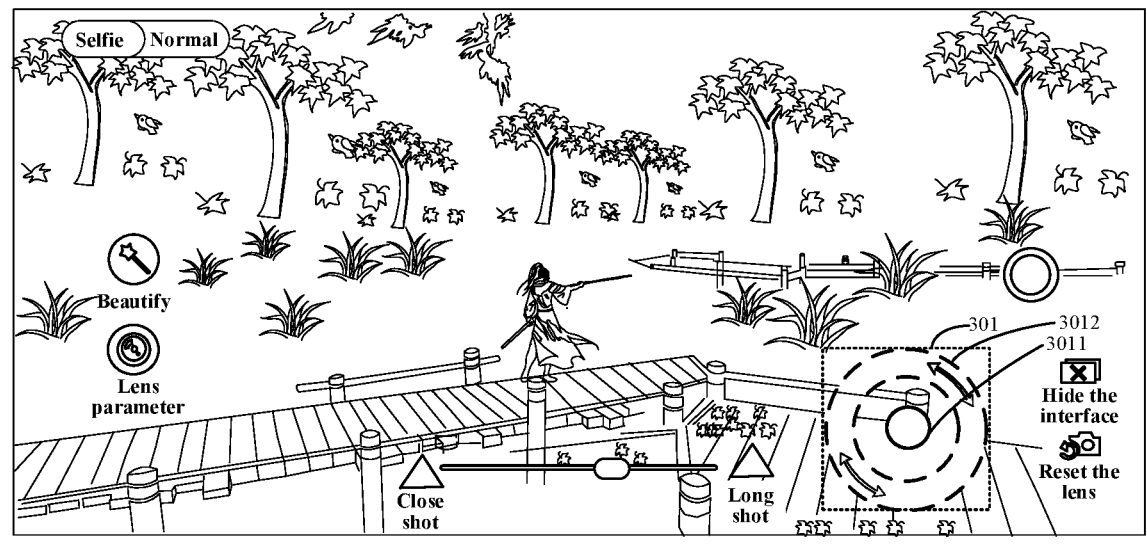
FIG. 3B is a schematic diagram of displaying a lens operation control according to an embodiment of this application.

FIG. 3B is a schematic diagram of displaying a lens operation control according to an embodiment of this application. In FIG. 3B, 301 represents a lens operation control, 301 may include a lens translation sub-control 3011 and a lens rotation sub-control 3012, and 3012 is a control formed by a dashed line in FIG. 3B. When the lens translation sub-control 3011 is triggered, the lens is translated based on a plane where the lens is located. When the lens rotation sub-control 3012 is triggered, the lens is rotated based on a plane where the lens is located.

As another optional implementation, the lens operation control may include an operation region and an operation trigger control. The operation region includes a translation operation subregion and a rotation operation subregion. The operation trigger control is movable in the translation operation subregion and the rotation operation subregion. The operation region may be a hollow annulus, and the operation trigger control may be a solid circle. An inner circle region in the hollow annulus is the translation operation subregion, and a non-overlapping region between an outer circle region and the inner circle region in the hollow annulus is the rotation operation subregion.

Figure 3C:
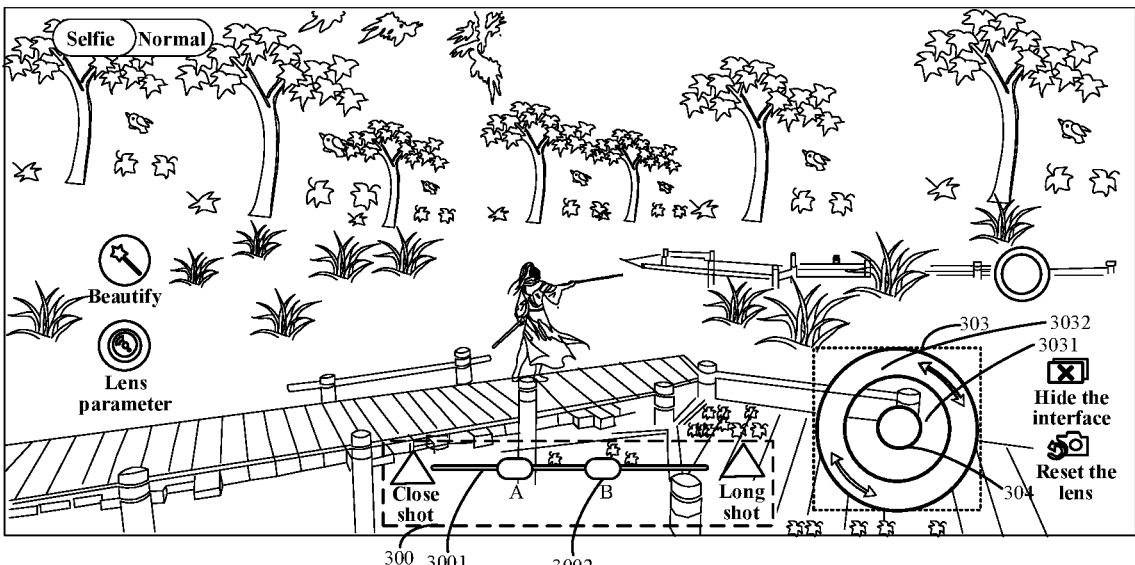
FIG. 3C is another schematic diagram of displaying a lens operation control according to an embodiment of this application.

In some embodiments, the terminal may not make a response to an operation inputted by a user or a player in the translation operation subregion or the rotation operation subregion. If the user or the player wants to adjust the lens, the operation trigger control may be dragged to be swiped in the translation operation subregion or the rotation operation subregion. FIG. 3C is another schematic diagram of displaying a lens operation control according to an embodiment of this application. In FIG. 3C, 303 represents a lens operation control, 3031 represents a translation operation subregion, 3032 represents a rotation operation subregion, and 304 represents an operation trigger control. The operation trigger control 304 may be dragged into the translation operation subregion 3031 and the rotation operation subregion 3032, and swiped in the two subregions.

As still another optional implementation, the lens operation control may include a lens translation subregion and a lens rotation subregion. Positions of the lens translation subregion and the lens rotation subregion on a terminal screen are fixed, that is, neither the lens translation subregion nor the lens rotation subregion moves as triggered by a user. In this embodiment, the lens translation subregion and the lens rotation subregion may have any shape, and a positional relationship between the lens translation subregion and the lens rotation subregion may be arbitrary. For example, the lens translation subregion may be a solid circle, and the lens rotation subregion may be a hollow annulus. A center of a circle of the lens translation subregion and a center of a circle of the lens rotation subregion may coincide. The center of a circle of the lens translation subregion and the center of a circle of the lens rotation subregion are on a same straight line but do not coincide.

Figure 3D:
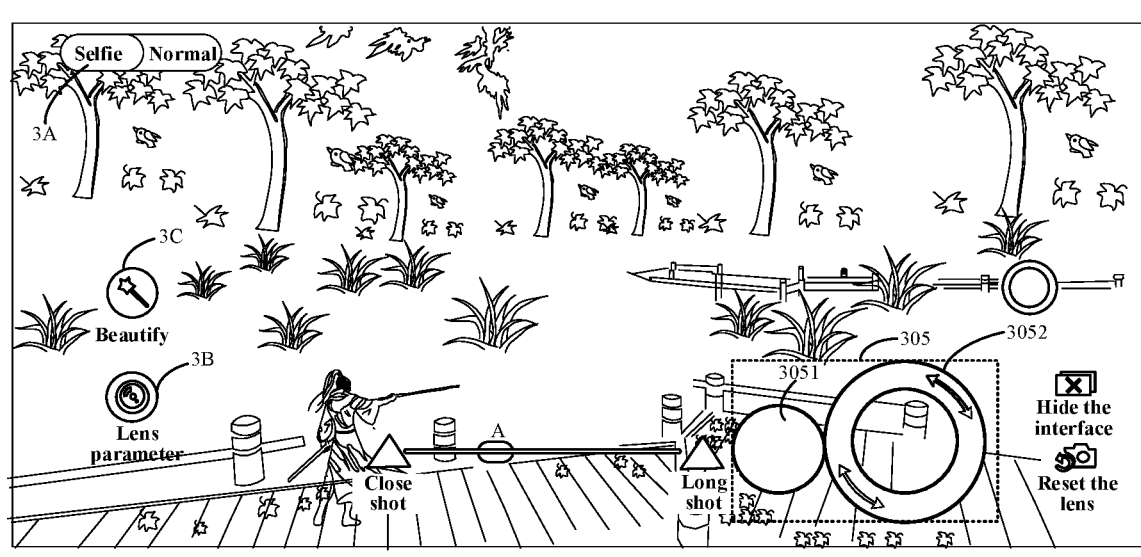
FIG. 3D is still another schematic diagram of displaying a lens operation control according to an embodiment of this application.

FIG. 3D is still another schematic diagram of displaying a lens operation control according to an embodiment of this application. 305 represents a lens operation control, 3051 represents a lens translation subregion, and 3052 represents a lens rotation subregion. 3051 may be a solid circle, 3052 may be a hollow annulus, and a center of a circle of the lens translation subregion and a center of a circle of the lens rotation subregion do not coincide.

In an embodiment, other contents may further be displayed on the terminal screen, such as a capturing mode option 3A, a lens parameter setting option 3B, a beautification option 3C of a captured picture, and the like in FIG. 3D. The capturing mode option may include a selfie mode and a normal mode, and the user may choose any capturing mode according to actual capturing requirements.

Step S202: Display a second captured picture in response to a touch operation performed by a user on the lens operation control, the second captured picture being obtained by adjusting a pose of a lens within a plane where the lens is located based on the touch operation and capturing a picture of the game scene with the pose-adjusted lens.

In an embodiment, the lens operation control may include a lens translation sub-control and a lens rotation sub-control, as shown in FIG. 3B. The lens translation sub-control may be a solid circle, and the lens rotation sub-control may be a hollow annulus. In some embodiments, an inner circle region in the hollow annulus on the lens operation control may be referred to as a moving region of the lens translation sub-control.

Based on this, the touch operation on the lens operation control may include any one or more of a drag operation performed on the lens translation sub-control in a moving region on the lens operation control corresponding to the lens translation sub-control or a swipe operation performed on the lens rotation sub-control.

Figure 4A:
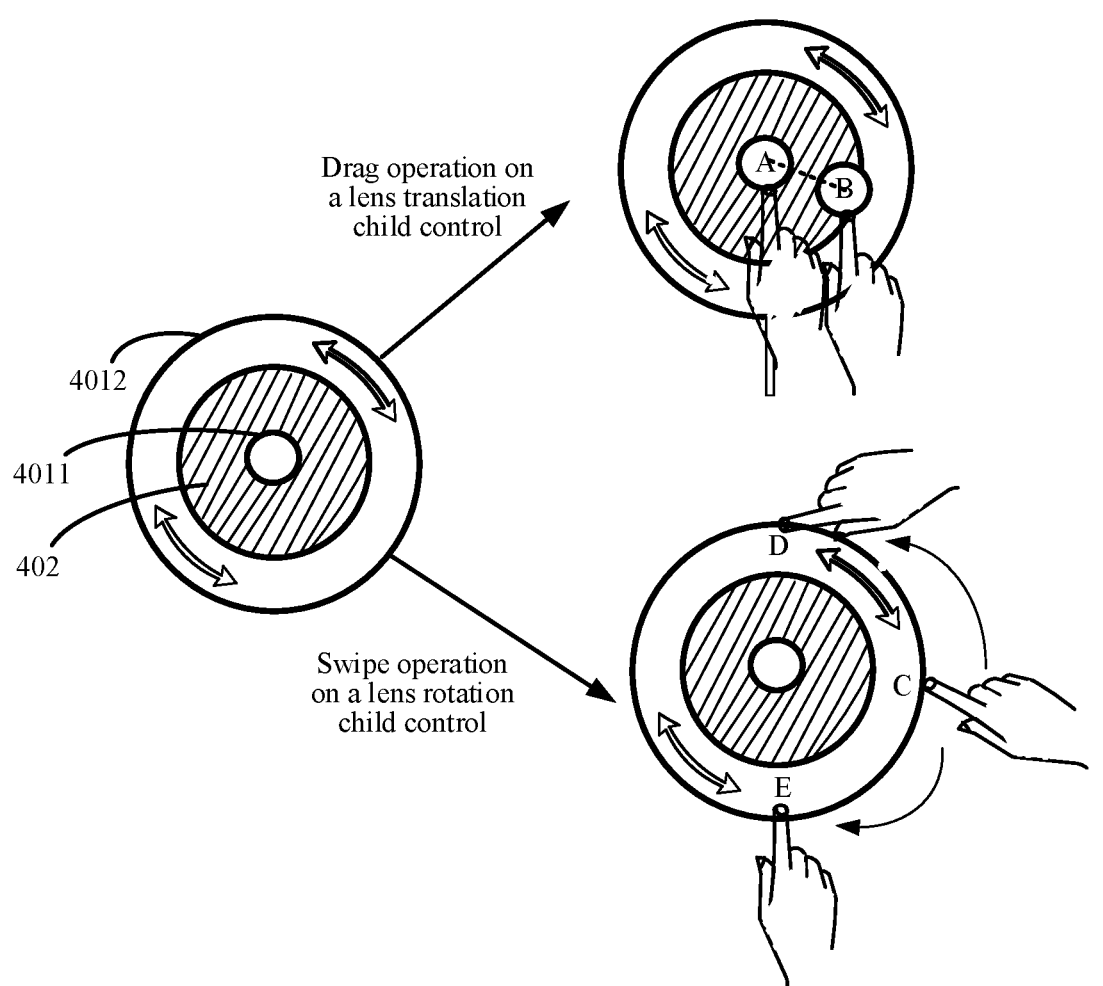
FIG. 4A is a schematic diagram of a lens operation control according to an embodiment of this application.

FIG. 4A is a schematic diagram of a lens operation control according to an embodiment of this application. In FIG. 4A, the lens operation control includes a lens translation sub-control 4011 and a lens rotation sub-control 4012. A moving region on the lens operation control corresponding to the lens translation sub-control may be shown by a shadow region 402 in 4a. The drag operation performed on the lens translation sub-control may be an operation of dragging the lens translation sub-control 4011 from a point A to a point B. The swipe operation performed on the lens rotation sub-control may mean that a user touches a point C on the lens rotation sub-control 4012 with a finger, and swipes from the point C as a swipe start point to a point D along a clockwise direction on the lens rotation sub-control, or swipes from a point C as a swipe start point to a point E along a counter-clockwise direction on the lens rotation sub-control. The point D and the point E may be referred to as swipe end points.

As an exemplary embodiment, on the lens operation control shown in FIG. 4A, when no drag operation is performed on the lens translation sub-control, a center of a circle of the lens translation sub-control coincides with a center of a circle of the lens rotation sub-control. When the center of a circle of the lens translation sub-control coincides with the center of a circle of the lens rotation sub-control, a position of the lens translation sub-control is referred to as an initial position. As shown in FIG. 4A, when no drag operation is performed on the lens translation sub-control 4011, the lens translation sub-control 4011 is at an initial position A.

Figures 4B, 4C:
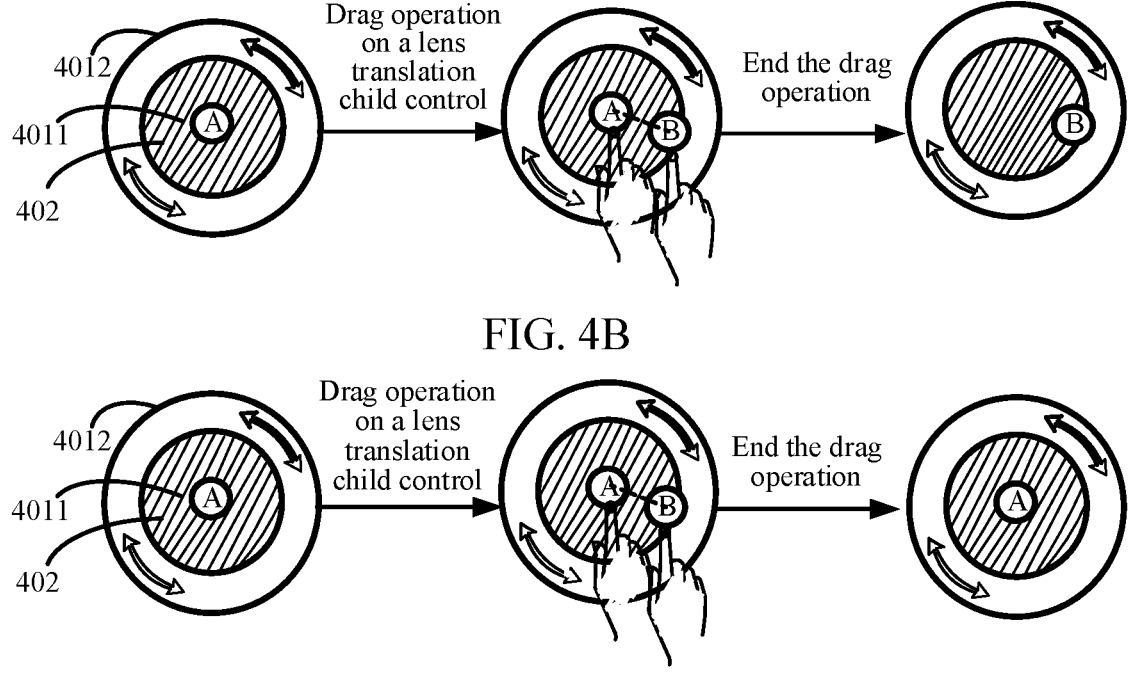
FIG. 4B is still another schematic diagram of displaying a lens operation control according to an embodiment of this application.
FIG. 4C is still another schematic diagram of displaying a lens operation control according to an embodiment of this application.

When a drag operation is performed on the lens translation sub-control, the lens translation sub-control is located at a position in the moving region where the drag operation is ended, when the drag operation ends. Referring to FIG. 4B, assuming that the lens translation sub-control 4011 is dragged from A to B in the manner shown in FIG. 4A, the drag operation is ended. In this case, the position of the lens translation sub-control 4011 on the lens operation control is B.

As another exemplary embodiment, when a drag operation is performed on the lens translation sub-control, the lens translation sub-control is returned to the initial position in the moving region when the drag operation is ended. Referring to FIG. 4C, assuming that the lens translation sub-control is dragged from A to B in the manner shown in FIG. 4A, the drag operation is ended. In this case, the lens translation sub-control 4011 is returned from the point B to the point A.

In another embodiment, the lens operation control includes an operation region and an operation trigger control, as shown in FIG. 3C. The operation region includes a translation operation subregion and a rotation operation subregion. In some embodiments, the operation region is a hollow annulus, and the operation trigger control is a solid circle. An inner circle region in the hollow annulus is the translation operation subregion, and a non-overlapping region between an outer circle region and the inner circle region in the hollow annulus is the rotation operation subregion.

Based on this, the touch operation performed on the lens operation control by the user may include any one or more of a first swipe operation performed on the operation trigger control in the translation operation subregion or a second swipe operation performed on the operation trigger control in the rotation operation subregion.

Figure 5A:
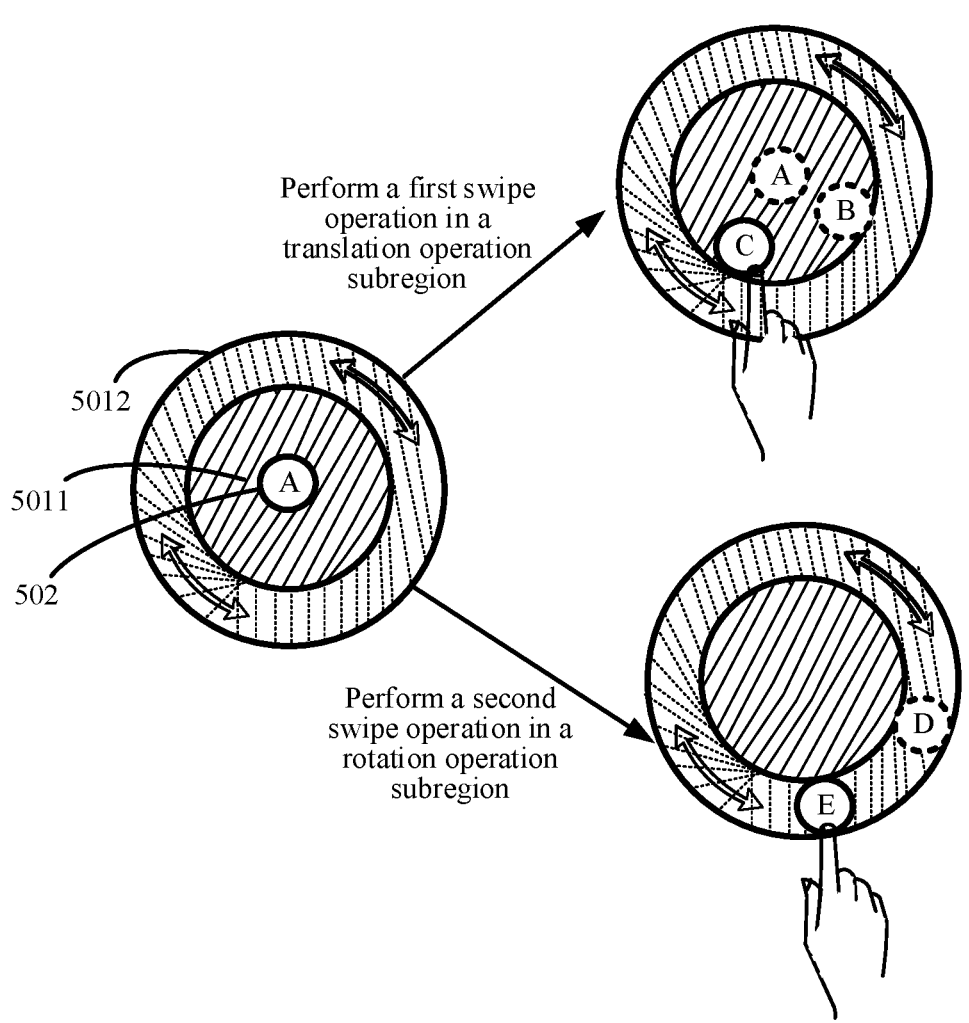
FIG. 5A is a schematic diagram of a lens operation control according to an embodiment of this application.

For example, FIG. 5A is still another schematic diagram of a lens operation control according to an embodiment of this application. The lens operation control shown in FIG. 5A may include a translation operation subregion 5011 (that is, a shaded part formed by solid lines), a rotation operation subregion 5012 (that is, a shaded part formed by dashed lines), and an operation trigger control 502. The user can drag the operation trigger control 502 to perform a first swipe operation in any direction in the translation operation subregion 5011, such as swiping from a position A to a position B, and then swiping from the position B to a position C. The user can drag the operation trigger control 502 to perform a second swipe operation clockwise or counterclockwise in the rotation operation subregion 5012, for example, swiping the operation trigger control from a position D to a position E of 5012 clockwise.

As an exemplary embodiment, in the lens operation control shown in FIG. 5A, when the first swipe operation and the second swipe operation are not performed on the operation touch control, the operation trigger control is located in the translation operation subregion, and a center of a circle of the operation trigger control coincides with a center of a circle of the operation region. As shown in FIG. 5A, when the first swipe operation and the second swipe operation are not performed, the operation trigger control is located at the position A. The position may be regarded as an initial position of the operation trigger control. When the first swipe operation or the second swipe operation is performed on the operation touch control, the operation trigger control may be returned to the initial position A from the position where the swipe operation ends, after the first swipe operation or the second swipe operation ends.

As another exemplary embodiment, when the first swipe operation or the second swipe operation is performed on the operation touch control, the operation trigger control may stay at the position where the swipe operation ends after the first swipe operation or the second swipe operation ends. In this case, if the operation trigger control is dragged from the position at the end of the operation back to the initial position before the swipe operation is inputted, the pose of the lens may be restored from the adjusted pose to the pose before the adjustment.

In still another embodiment, the lens operation control may further include a lens translation subregion and a lens rotation subregion, as shown in FIG. 3D. Based on this, the touch operation on the lens operation control may further include any one or more of the following operations: inputting a third swipe operation into the lens translation subregion, or inputting a fourth swipe operation into the lens rotation subregion. The third swipe operation may mean swiping up and down, left and right, and obliquely at any angle on the lens translation subregion, and the terminal may determine a distance variation caused by swiping according to a swiping distance and a finger strength during swiping. The fourth swipe operation may mean swiping in a clockwise direction or a counterclockwise direction on the lens rotation subregion.

Figure 5B:
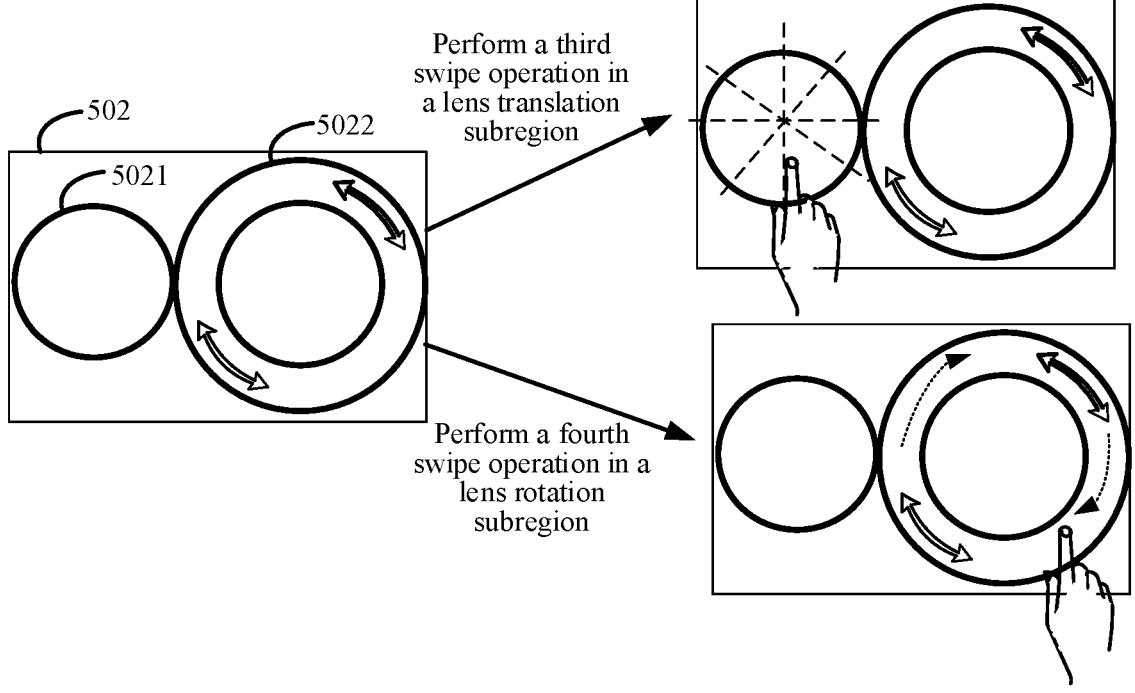
FIG. 5B is still another schematic diagram of a lens operation control according to an embodiment of this application.

For example, FIG. 5B is still another schematic diagram of a lens operation control according to an embodiment of this application. An operation control 502 shown in FIG. 5B includes a lens translation subregion 5021 and a lens rotation subregion 5022. The third swipe operation means swiping on 5021 in a direction indicated by dashed lines (only a part of the swipe operation direction is shown in FIG. 5B) on the lens translation subregion 5021, and the fourth swipe operation means swiping in a direction indicated by dashed lines on 5022.

In an embodiment, after the touch operation on the lens operation control is received in step S202, the terminal adjusts the pose of the lens according to the touch operation.

In this regard, in the conventional technology, the pose of the lens is adjusted based on the game scene space, which may be specifically as follows. The lens is regarded as a mass point in the game scene space, regardless of the orientation of the lens. When a touch operation inputted by the user is received, if the touch operation is used for instructing to adjust the lens upward by a target distance, three-dimensional coordinates of the lens in the game scene space are acquired, and vertical axis coordinates in the three-dimensional coordinates are increased by the target distance to obtain new three-dimensional coordinates. The lens is moved from the three-dimensional coordinates to the new three-dimensional coordinates. In this way, if the lens faces down in the game scene space, and the user enters an operation to move the lens upward, the effect seen on the terminal screen is that the lens is increasingly farther from the ground, which is different from the expected effect.

Different from the conventional technology, in the embodiment of this application, the pose of the lens is not adjusted for the three-dimensional coordinates of the lens in the game scene space, but the operation by the user is mapped to the plane where the lens is located, and then the pose of the lens is adjusted based on the plane where the lens is located. The plane where the lens is located is the plane in the game scene space that is perpendicular to the orientation of the lens. That is to say, during the adjustment to the pose of the lens in the embodiment of this application, the orientation of the lens is considered. In this way, for the user, the direction indicated by the touch operation by the user on the terminal screen is exactly the same as the moving direction of the lens that the user sees, and the user does not need to repeatedly input the touch operation to find a suitable captured picture, which reduces response power consumption of the terminal to the touch operation.

In an embodiment, the adjusting a pose of a lens according to the touch operation and a plane where the lens is located may specifically include: mapping, to the plane where the lens is located, movement information generated by the touch operation of the lens operation control in a game scene, such as an angle, a position, and a distance, and adjusting, based on the mapped movement information, the pose of the lens in the plane where the lens is located at a current moment.

In some embodiments, if the performing the touch operation on the lens operation control means performing the second swipe operation on the operation trigger control in the rotation operation subregion, the adjusting, according to the touch operation, the pose of the lens and the plane where the lens is located may include: determining a target angle according to the second swipe operation, and determining a rotation direction according to the second swipe operation; and rotating the orientation of the lens by the target angle in the rotation direction based on a perpendicular bisector of the plane where the lens is located. For example, the target angle is 45 degrees, and the rotation direction is the counterclockwise direction. Based on the perpendicular bisector of the plane where the lens is located, the orientation of the lens is rotated by 45 degrees counterclockwise based on the current orientation.

In some embodiments, if the performing the touch operation on the lens operation control means performing the first swipe operation on the operation trigger control in the lens translation subregion, the adjusting, according to the touch operation, the pose of the lens in the plane where the lens is located may include: calculating, according to the position of the first swipe operation and a central position of the lens operation control, a moving direction and a moving speed of the lens in the plane where the lens is located; and adjusting, according to the determined moving direction and moving speed, the position of the lens at the current moment in the plane where the lens is located.

In an embodiment, after the pose of the lens in the plane where the lens is located is adjusted, the pose-adjusted lens is controlled to capture a picture of a scene content in the game scene control to obtain a second captured picture and display the second captured picture on the terminal screen.

Figure 6A:
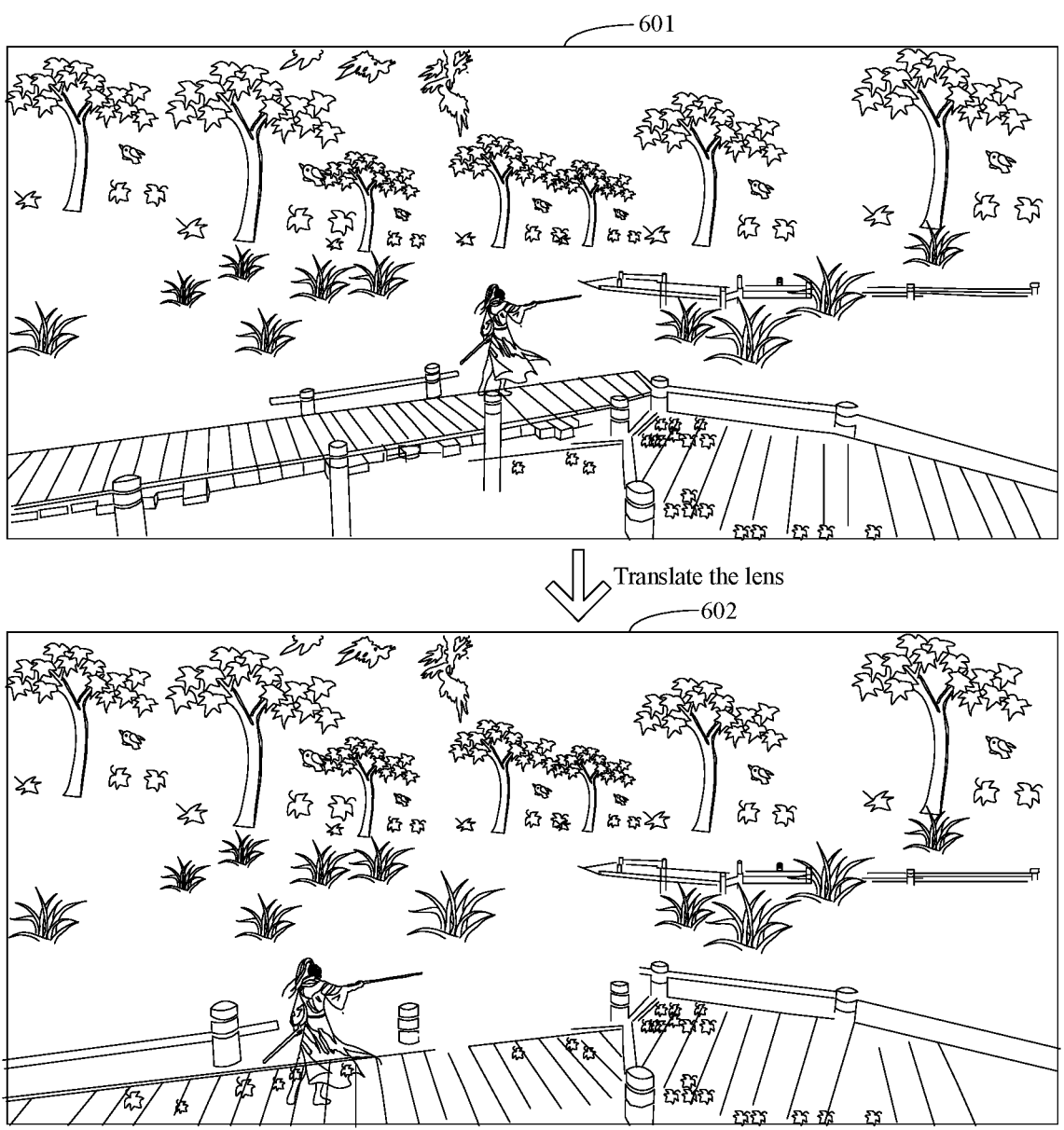
FIG. 6A is a schematic diagram of displaying a second captured picture according to an embodiment of this application.

In some embodiments, assuming that the first captured picture is shown in FIG. 3A, if the adjustment to the pose of the lens means translating the lens, the schematic diagram of displaying the second captured picture on the terminal screen may be shown in FIG. 6A. In FIG. 6A, 601 represents the first captured picture displayed on the terminal screen, and the second captured picture captured by the lens after translating the position of the lens in the plane where the lens is located is shown in 602 in FIG. 6A.

Figure 6B:
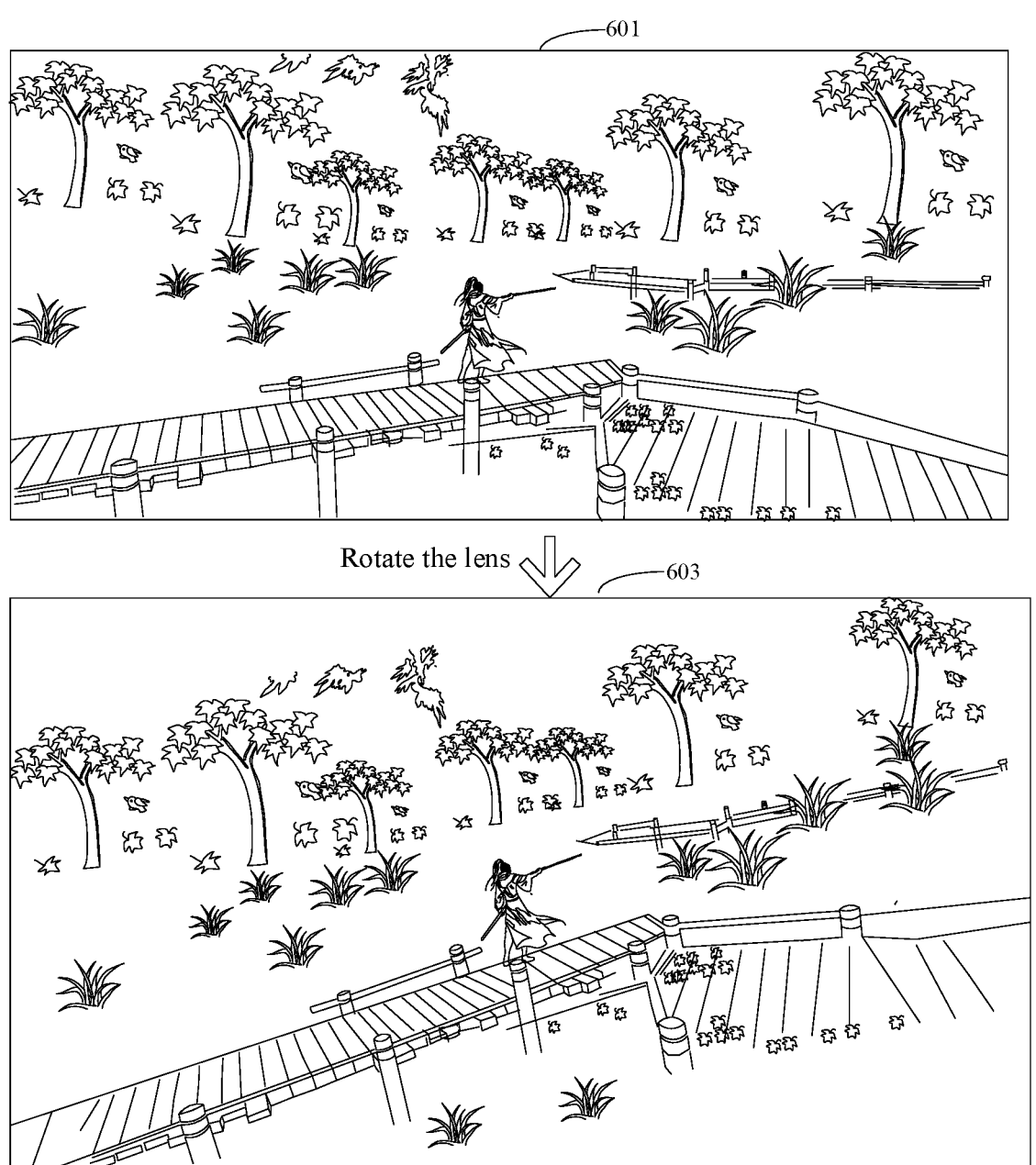
FIG. 6B is another schematic diagram of displaying a second captured picture according to an embodiment of this application.

In some embodiments, assuming that the first captured picture is shown in FIG. 3A, if the adjustment to the pose of the lens means rotating the lens, the schematic diagram of displaying the second captured picture on the terminal screen may be shown in FIG. 6B. In FIG. 6B, 601 represents the first captured picture displayed on the terminal screen, and the second picture captured by the lens after rotating the orientation of the lens in the plane where the lens is located may be shown in 603 in FIG. 6B.

In an embodiment, when the second captured picture is displayed on the terminal screen, the terminal screen may further include a lens pose reset control. FIG. 6C is a schematic diagram of a terminal screen according to an embodiment of this application. A second captured picture is displayed on the terminal screen after the lens is rotated. 604 represents a lens pose reset control. When the lens pose reset control 604 is triggered, a pose the lens is restored from the adjusted pose to the pose before the adjustment, and a first captured picture is displayed on the terminal screen instead of the second captured picture.

In the embodiment of this application, a first captured picture in a capturing mode in a game application is displayed on the terminal screen, and a lens operation control is displayed in the first captured picture. The second captured picture is displayed on the terminal screen in response to a touch operation performed by a user on the lens operation control. The second captured picture is obtained by adjusting a pose of a lens according to the touch operation and a plane where the lens is located and capturing a picture of a scene content in a game scene space with the pose-adjusted lens. In the foregoing process, the pose of the lens is adjusted by performing the touch operation on the lens operation control, so as to take photos at various angles in the game. In addition, the adjustment to the pose of the lens is performed based on the plane where the lens is located, rather than based on the game scene control. The plane where the lens is located is the plane in the game scene space that is perpendicular to the orientation of the lens. It can be seen that the orientation of the lens is taken into account during adjustments to the pose of the lens based on the plane where the lens is located. In this way, the adjustment operation indicated by the touch operation may be consistent with the actual adjustment to the lens, thereby ensuring the accuracy of lens adjustment.

Based on the foregoing method for displaying a captured picture, an embodiment of this application provides another method for displaying a captured picture. FIG. 7 is another schematic flowchart of a method for displaying a captured picture according to an embodiment of this application. The method for displaying a captured picture shown in FIG. 7 may be performed by a terminal, for example, the terminal 130 in FIG. 1C, and may be specifically performed by a processor of the terminal. The method for displaying a captured picture shown in FIG. 7 may include the following steps.

Step S701: Display, on a graphical interface on a terminal screen, a first captured picture of a game scene in a capturing mode in a game application, and display a lens operation control in the first captured picture, the lens operation control including a translation operation subregion, a rotation operation subregion, and an operation trigger control.

In an embodiment, for some feasible implementations included in step S701, reference may be made to the description of step S201 in the embodiments of FIG. 2, and the details are not described herein again.

Step S702: Adjust, when a second swipe operation is performed on the operation trigger control in the rotation operation subregion, a pose of a lens within a plane where the lens is located according to the second swipe operation.

It may be learned from the foregoing that when the touch operation on the lens operation control is received, the pose of the lens is adjusted according to the touch operation and the plane where the lens is located. It may be learned from step S701 that the lens operation control is formed by a translation subregion, a rotation subregion, and an operation trigger control. The touch operation may include any one or more of a first swipe operation performed on the operation trigger control in the translation subregion or a second swipe operation performed on the operation trigger control in the rotation subregion.

That is to say, when the second swipe operation is performed on the operation trigger control in the rotation operation subregion, the lens is translated according to the second swipe operation and the plane where the lens is located, that is step S702. When the first swipe operation is performed on the operation trigger control in the translation operation subregion, the lens is rotated according to the first swipe operation and the plane where the lens is located, that is, step S703.

In an embodiment, step S702 of rotating the lens according to the second swipe operation and the plane where the lens is located may include: determining a target angle according to the second swipe operation, and determining a rotation direction according to the second swipe operation; and rotating the orientation of the lens by the target angle in the rotation direction based on a perpendicular bisector of the plane where the lens is located.

Specifically, the determining a target angle according to the second swipe operation includes: acquiring a swipe start point and a swipe end point of the second swipe operation in the rotation operation subregion; determining a first connecting line between the swipe start point and a center point of the rotation operation subregion and a second connecting line between the swipe end point and the center point of the rotation operation subregion; and determining an included angle between the first connecting line and the second connecting line as the target angle.

FIG. 8A is a schematic diagram showing determination of a target angle according to an embodiment of this application. The lens operation control shown in FIG. 8A includes a translation operation subregion 8011 (that is, a solid shadow region), a rotation operation subregion 8012 (that is, a dashed shadow region), and an operation trigger control 802. A user starts to input a second swipe operation at a swipe start point A on the rotation subregion 8012, and stops the second swipe operation at a swipe end point B. Assuming that O represents a center point of the rotation operation subregion, a line connecting the point A and the center point O is used as a first connecting line AO, and a line connecting the point B and the center point O is used as a second connecting line BO. Further, an included angle α between AO and BO is used as the target angle.

In an embodiment, the determining a rotation direction according to the second swipe operation includes: acquiring a swipe start point and a swipe end point of the second swipe operation in the rotation operation subregion; determining, when the swipe end point is in a counterclockwise direction of the swipe start point, that the rotation direction is the counterclockwise direction; and determining, when the swipe end point is in a clockwise direction of the swipe start point, that the rotation direction is the clockwise direction. For example, referring to FIG. 8A, when the swipe end point B is in a counterclockwise direction of the swipe start point A, it is determined that the rotation direction is the counterclockwise direction.

In an embodiment, the lens is rotated according to the rotation direction in the plane where the lens is located. The target angle may be rotation of the lens in the plane where the lens is located. The rotation of the lens is performed by using, as an axis, a perpendicular bisector of the plane where the lens is located.

Figure 8B:
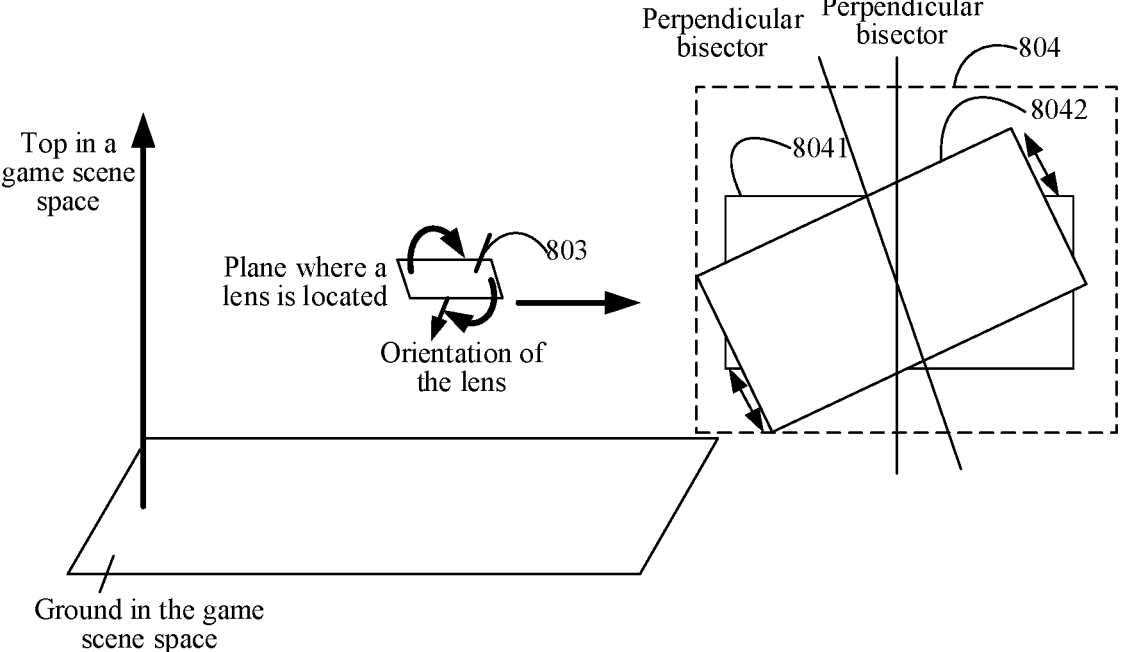
FIG. 8B is a schematic diagram showing rotation of a lens according to an embodiment of this application.

FIG. 8B is a schematic diagram showing rotation of a lens according to an embodiment of this application. 803 represents an orientation of the lens before the lens is rotated, and 804 represents rotation of the lens in the plane where the lens is located. Assuming that the second swipe operation is not received on the rotation operation subregion, the lens plane is 8041. After the second swipe operation is received, the lens rotates, according to a rotation direction and a rotation angle indicated by the second swipe operation, in the plane where the lens is located, and the lens plane after rotation is shown as 8042. In other words, the orientation of the lens is not in a horizontal orientation after the rotation.

Step S703: Adjust, when a first swipe operation is performed on the operation trigger control in the translation operation subregion, the pose of the lens according to the first swipe operation and the plane where the lens is located.

In an embodiment, step S703 of translating the lens according to the first swipe operation and the plane where the lens is located may include: establishing a world coordinate system in the game scene space, and acquiring reference position information of the lens in the world coordinate system; establishing a lens coordinate system based on the plane where the lens is located; acquiring a vertical axis conversion parameter; determining a transverse axis conversion parameter and a longitudinal axis conversion parameter according to the first swipe operation; inputting the vertical axis conversion parameter, the transverse axis conversion parameter, the longitudinal axis conversion parameter, and the reference position information into a rule for position conversion between coordinate systems for calculation, to obtain target position information of the lens in the lens coordinate system; and moving, in the lens coordinate system, the lens from a current position to a position indicated by the target position information.

It may be understood that in order to perform translation adjustment on the pose of the lens in the plane where the lens is located, it is necessary to map the first swipe operation and the reference position information of the lens in the world coordinate system in the game scene space to the lens coordinate system established based on the plane where the lens is located. During specific implementation, the mapping from the world coordinate system in the game scene space to the plane where the lens is located mainly relies on rotation transformation and translation transformation. Therefore, the conversion parameters in step S703 may include a rotation parameter and a translation parameter. The rotation parameter is a parameter generated during the rotation transformation, and the translation parameter is a parameter generated during the translation transformation.

In an embodiment, based on this, the transverse axis conversion parameter includes a transverse axis rotation parameter, and the longitudinal axis conversion parameter includes a longitudinal axis rotation parameter. The determining a transverse axis conversion parameter and a longitudinal axis conversion parameter according to the first swipe operation includes: determining a transverse axis rotation angle and a longitudinal axis rotation angle according to the first swipe operation; inputting the transverse axis rotation angle into a transverse axis rotation parameter calculation rule for calculation to obtain the transverse axis rotation parameter, and inputting the longitudinal axis rotation angle into a longitudinal axis rotation parameter calculation rule for calculation to obtain the longitudinal axis rotation parameter.

The determining a transverse axis rotation angle and a longitudinal axis rotation angle according to the first swipe operation may include: acquiring, from the lens coordinate system, a target ray representing the orientation of the lens; projecting the target ray onto a plane formed by a longitudinal axis and a vertical axis, and determining an included angle between a ray obtained after projection and the vertical axis as the transverse axis rotation angle; and projecting the target ray onto a plane formed by a transverse axis and a vertical axis, and determining an included angle between a ray obtained after projection and the vertical axis as the longitudinal axis rotation angle.

Figure 8C:
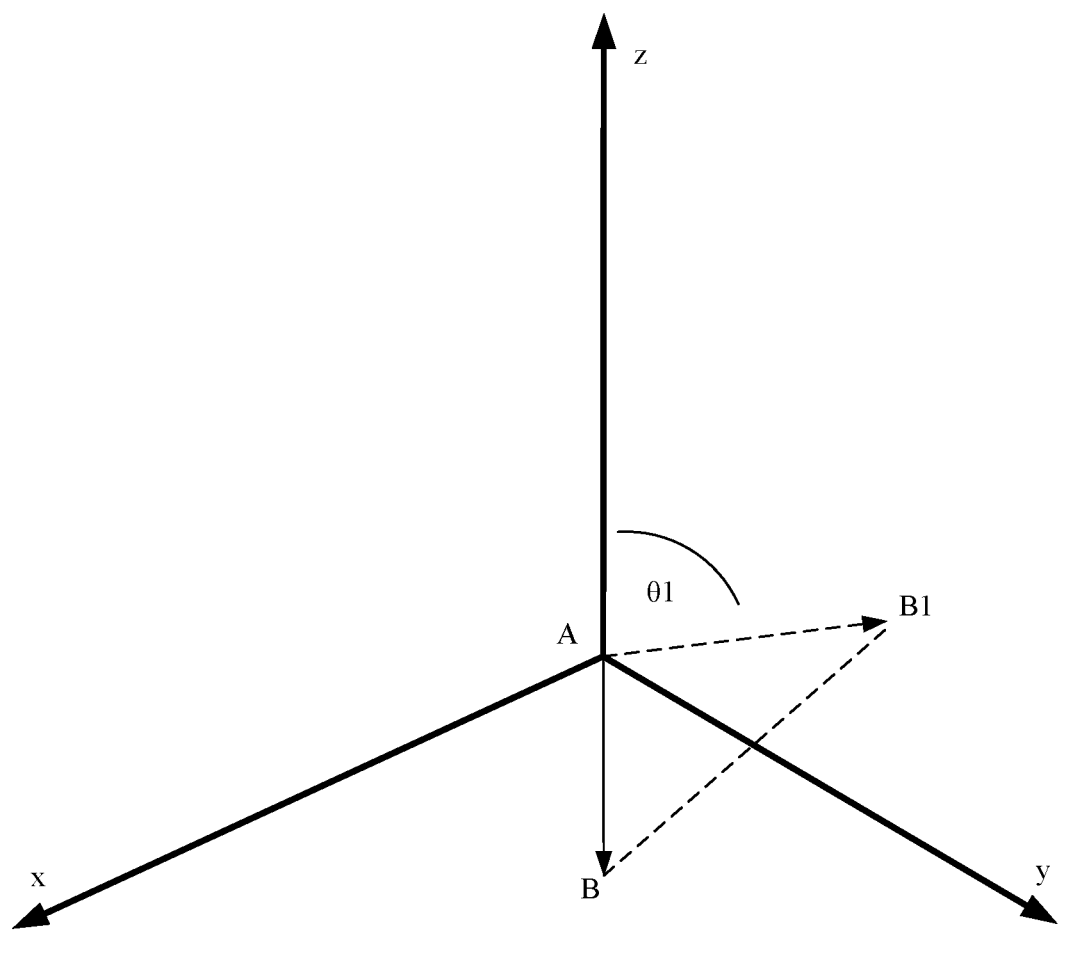
FIG. 8C is a schematic diagram showing determination of a transverse axis rotation angle according to an embodiment of this application.

FIG. 8C is a schematic diagram showing determination of a transverse axis rotation angle according to an embodiment of this application. It is assumed that AB is a target ray representing the orientation of the lens in the lens coordinate system. When the transverse axis rotation angle is calculated, the ray AB is projected onto a plane perpendicular to the transverse axis, that is, a plane formed by a longitudinal axis and a vertical axis. The projected ray is AB1, and an included angle $\theta 1$ between the ray AB1 and the vertical axis is the transverse axis rotation angle.

Figure 8D:
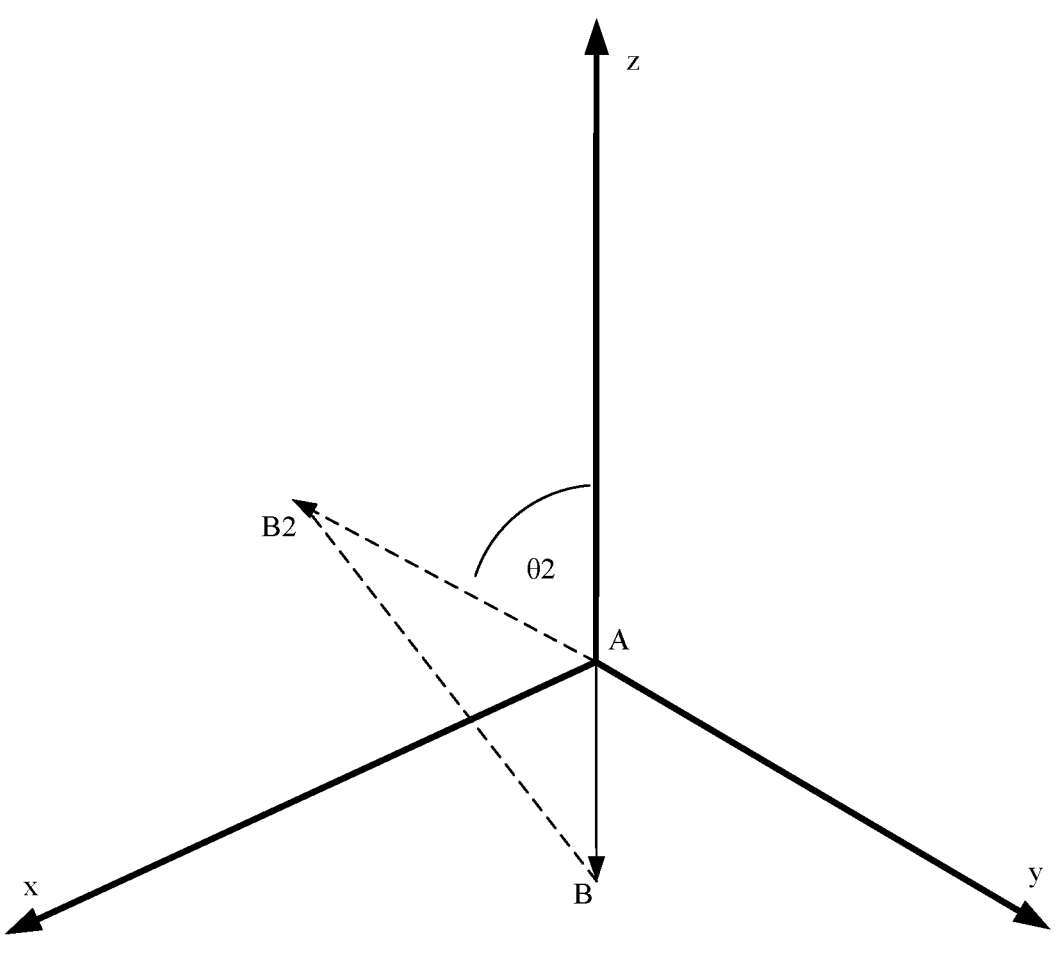
FIG. 8D is a schematic diagram showing determination of a longitudinal axis rotation angle according to an embodiment of this application.

FIG. 8D is a schematic diagram showing determination of a longitudinal axis rotation angle according to an embodiment of this application. When the longitudinal axis rotation angle is calculated, the ray AB is projected onto a plane perpendicular to the longitudinal axis, that is, a plane formed by a transverse axis and a vertical axis. The projected ray is AB2, and an included angle $\theta 2$ between the ray AB2 and the vertical axis is the longitudinal axis rotation angle.

After the transverse axis rotation angle and the longitudinal axis rotation angle are determined by using the foregoing method, the transverse axis rotation angle is inputted into a transverse axis rotation parameter calculation rule for calculation to obtain the transverse axis rotation parameter. In some embodiments, the transverse axis rotation parameter calculation rule may be a calculation matrix, and the transverse axis rotation parameter may be obtained by substituting the transverse axis rotation angle $\theta_1$ into the matrix, as shown in formula (1):

$$\begin{bmatrix} 1 & 0 & 0 & 0 \\ 0 & \cos\theta_1 & -\sin\theta_1 & 0 \\ 0 & \sin\theta_1 & \cos\theta_1 & 0 \\ 0 & 0 & 0 & 1 \end{bmatrix} \tag{1}$$

Similarly, the longitudinal axis rotation parameter calculation rule may also be a calculation matrix, and the longitudinal axis rotation parameter may be obtained by substituting $\theta_2$ the longitudinal axis rotation angle into the matrix, as shown in formula (2):

$$\begin{bmatrix} \cos\theta_2 & 0 & \sin\theta_2 & 0 \\ 0 & 1 & 0 & 0 \\ -\sin\theta_2 & 0 & \cos\theta_2 & 0 \\ 0 & 0 & 0 & 1 \end{bmatrix} \tag{2}$$

In an embodiment, the transverse axis conversion parameter includes a transverse axis translation parameter, and the longitudinal axis conversion parameter includes a longitudinal axis translation parameter. The determining a transverse axis conversion parameter and a longitudinal axis conversion parameter according to the first swipe operation includes: acquiring a transverse axis distance variation and a longitudinal axis distance variation generated by the first swipe operation; determining the transverse axis translation parameter according to the transverse axis distance variation, and determining the longitudinal axis translation parameter according to the longitudinal axis distance variation. It is assumed that the transverse axis distance variation is expressed as $t_x$, and the longitudinal axis distance variation is expressed as $t_y$.

The transverse axis distance variation generated by the first swipe operation is a distance change of the operation trigger control in a transverse axis direction in a process of swiping the operation trigger control from the position of a center of a circle of the lens operation control to the position where the first swipe operation ends. Similarly, the longitudinal axis distance variation generated by the first swipe operation is a distance change of the operation trigger control in a longitudinal axis direction in the foregoing process.

Figure 9A:
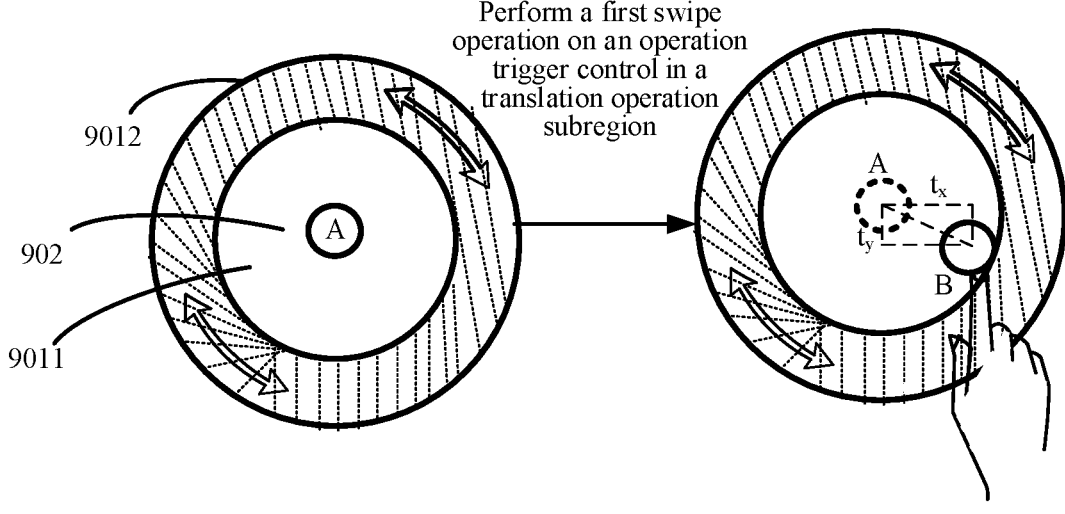
FIG. 9A is a schematic diagram showing determination of a transverse axis distance variation and a longitudinal axis distance variation according to an embodiment of this application.

FIG. 9A is a schematic diagram showing determination of a transverse axis distance variation and a longitudinal axis distance variation according to an embodiment of this application. In FIG. 9A, it is assumed that 9011 represents the translation operation subregion, 9012 represents the rotation operation subregion, and 902 represents the operation trigger control. The first swipe operation is inputted into the operation trigger control 902 in the translation operation subregion 9011, so that the operation trigger control moves from a position A to a position B. In this process, the distance of the operation trigger control in the transverse axis direction changes, that is, the transverse axis distance variation is $t_x$, and the distance in the longitudinal axis direction changes, that is, the longitudinal axis distance variation is $t_y$.

In an embodiment, the determining the transverse axis translation parameter according to the transverse axis distance variation, and determining the longitudinal axis translation parameter according to the longitudinal axis distance variation may include: acquiring a mapping ratio between the distance change of the operation trigger control in the translation operation subregion and a true distance change of the lens, performing preset calculation on the mapping ratio and the transverse axis distance variation, and using a calculation result as the transverse axis translation parameter; and performing preset calculation on the mapping ratio and the longitudinal axis distance variation, and using a calculation result as the longitudinal axis translation parameter. For example, the terminal presets the mapping ratio of 3:1 between the distance change of the operation trigger control in the translation operation subregion and the true distance change. That is to say, the distance of the operation trigger control in the translation operation subregion changes by 3 units, which means that the true distance of the lens changes by 1 unit.

In an embodiment, the vertical axis conversion parameter includes a vertical axis rotation parameter, and the acquiring a vertical axis conversion parameter includes: acquiring a vertical axis rotation angle, the vertical axis rotation angle being zero when the second swipe operation is not received, and the vertical axis rotation angle being a target angle determined according to the second swipe operation when the second swipe operation is received; and inputting the vertical axis rotation angle into a vertical axis rotation parameter calculation rule for calculation to obtain the vertical axis rotation parameter. It may be learned from the foregoing that when the second swipe operation is performed on the operation trigger control in the rotation operation subregion, for the implementation of determining the angle according to the second swipe operation, reference may be made to FIG. 8A, and the target angle determined in FIG. 8A is the vertical axis rotation angle.

In some embodiments, the vertical axis rotation parameter calculation rule may be a calculation matrix, and the vertical axis rotation parameter may be obtained by substituting the vertical axis rotation angle $\alpha$ into the matrix, as shown in formula (3):

$$\begin{bmatrix} \cos\alpha & -\sin\alpha & 0 & 0 \\ \sin\alpha & \cos\alpha & 0 & 0 \\ 0 & 0 & 1 & 0 \\ 0 & 0 & 0 & 1 \end{bmatrix} \tag{3}$$

In an embodiment, the terminal screen may further include a capturing distance adjustment control. The translation parameter may further include a vertical axis translation parameter, and the determining a vertical axis conversion parameter includes: determining that the vertical axis translation parameter of the lens is zero when no adjustment operation is performed on the capturing distance adjustment control; and acquiring, when an adjustment operation is performed on the capturing distance adjustment control, an adjusted position of the capturing distance adjustment control after the adjustment operation is received, and determining a difference between the adjusted position and a position before the adjustment as the vertical axis translation parameter of the lens. The determining the vertical axis translation parameter according to the difference may mean determining the difference as the vertical axis translation parameter. Alternatively, the vertical axis translation parameter is determined according to a ratio threshold and the difference between the preset difference and the vertical axis translation parameter. For example, the ratio threshold between the preset difference and the vertical axis translation parameter is 4:1. Assuming that the difference is z, the vertical axis translation parameter is 4z.

In an embodiment, the capturing distance adjustment control is composed of an adjustment region and an adjustment assembly. The adjustment assembly is swiped in the adjustment region to generate an adjustment operation. Referring to FIG. 3C, 300 represents the capturing distance adjustment control, and the terminal screen may further include an adjustment region 3001 of a capturing distance control. 3001 represents the adjustment region, and 3002 represents the adjustment assembly. An adjustment operation is generated by sliding the adjustment assembly 3002 in the adjustment region 3001. In some embodiments, the terminal may be set to slide 3002 to the left in the adjustment region 3001 to reduce the capturing distance, and to slide 3002 backward in the adjustment region to increase the capturing distance. In some embodiments, when no adjustment operation is received, 3002 may be located at the middle position of the adjustment region 3001 or at any other position. Assuming that the adjustment assembly 3002 is at the position A prior to receiving an adjustment operation, and the adjustment assembly is at the position B after the adjustment operation is received, the vertical axis translation parameter is determined according to the length of a line segment AB.

It may be learned from the foregoing that the transverse axis translation parameter $t_x$ included in the transverse axis conversion parameter and the longitudinal axis translation parameter $t_y$ included in the longitudinal axis conversion parameter are determined based on the operation of the lens operation control, and the vertical axis translation parameter $t_z$ included in the vertical axis conversion parameter is determined according to the capturing distance adjustment control.

Figure 9B:
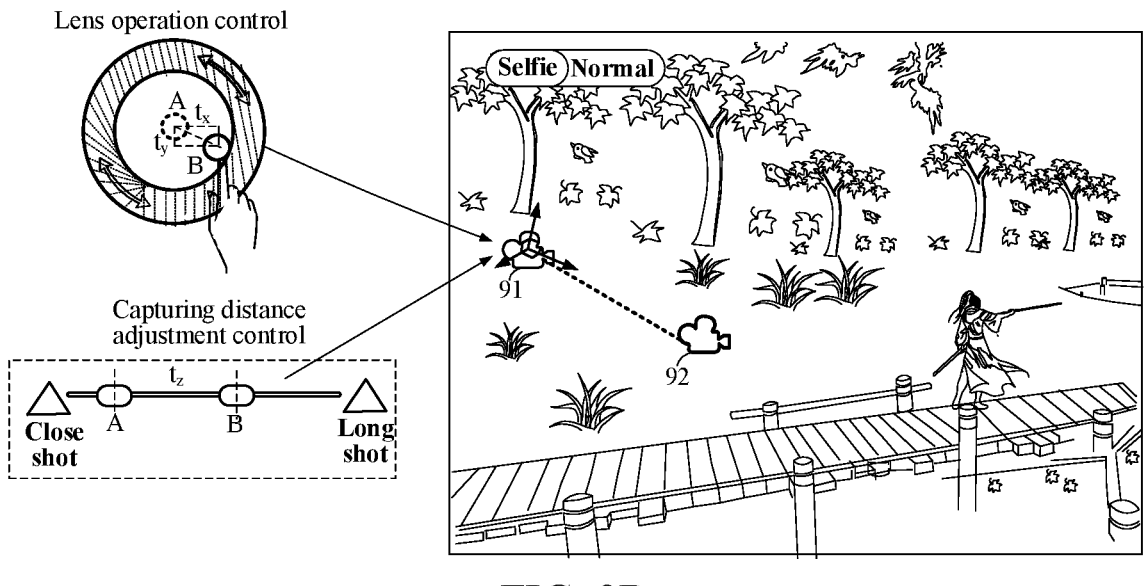
FIG. 9B is a schematic diagram showing an adjustment to a pose of a lens according to an embodiment of this application.

FIG. 9B is a schematic diagram showing an adjustment to a pose of a lens according to an embodiment of this application. Assuming that before the lens is adjusted, the position of the lens in the game scene control is 91. After the operation is inputted into the lens operation control and the operation is performed on the capturing adjustment control, the lens moves from the position 91 to a position 92.

After the transverse axis conversion parameter, the longitudinal axis conversion parameter, and the vertical axis conversion parameter are determined by using the foregoing steps, the parameters and the reference position information are substituted into a rule for position conversion between coordinate systems for calculation, to obtain target position information of the lens in the plane where the lens is located. In some embodiments, the rule for position conversion between coordinate systems may be expressed as:

$$X_D = R * T * X_c \qquad (4)$$

$X_D$ represents the target position information of the lens in the lens coordinate system, R represents the rotation parameter, the rotation parameter being obtained by multiplying the transverse axis rotation parameter, the longitudinal axis rotation parameter, and the vertical axis rotation parameter, T represents the translation parameter, the translation parameter being determined according to the transverse axis translation parameter $t_x$, the longitudinal axis translation parameter $t_y$, and the vertical axis translation parameter, and $X_c$ represents the reference position information of the lens in the world coordinate system. T is the matrix obtained based on $t_x$, $t_y$, and $t_z$, as shown in formula (5):

$$T = \begin{bmatrix} 1 & 0 & 0 & t_x \\ 0 & 1 & 0 & t_y \\ 0 & 0 & 1 & t_z \\ 0 & 0 & 0 & 1 \end{bmatrix} \qquad (5)$$

R, T, and $X_c$ are substituted into a rule for position conversion between planes for calculation to obtain the target position information. The specific calculation may be expressed as formula (6):

$$X_D = \begin{bmatrix} 1 & 0 & 0 & 0 \\ 0 & \cos\theta_1 & -\sin\theta_1 & 0 \\ 0 & \sin\theta_1 & \cos\theta_1 & 0 \\ 0 & 0 & 0 & 1 \end{bmatrix} * \begin{bmatrix} \cos\theta_2 & 0 & \sin\theta_2 & 0 \\ 0 & 1 & 0 & 0 \\ -\sin\theta_2 & 0 & \cos\theta_2 & 0 \\ 0 & 0 & 0 & 1 \end{bmatrix} * \\ \begin{bmatrix} \cos\alpha & -\sin\alpha & 0 & 0 \\ \sin\alpha & \cos\alpha & 0 & 0 \\ 0 & 0 & 1 & 0 \\ 0 & 0 & 0 & 1 \end{bmatrix} * \begin{bmatrix} 1 & 0 & 0 & t_x \\ 0 & 1 & 0 & t_y \\ 0 & 0 & 1 & t_z \\ 0 & 0 & 0 & 1 \end{bmatrix} * X_c \qquad (6)$$

After the target position information of the lens is determined, the lens is moved, in the plane where the lens is located, from a current position to a position indicated by the target position information.

Step S704: Capture a picture of a scene content in a game scene space with the pose-adjusted lens, to obtain a second captured picture and display the second captured picture on the terminal screen.

In an embodiment, after the lens is adjusted in the plane where the lens is located by using step S702 and step S703, the pose-adjusted lens is used for capturing the game scene to obtain a second captured picture and display the second captured picture on the terminal screen.

In the embodiment of this application, a first captured picture in a capturing mode in a game application is displayed on the terminal screen, and a lens operation control is displayed in the first captured picture. The lens operation control includes an operation region and an operation trigger control. The operation region includes a translation operation subregion and a rotation operation subregion. When the second swipe operation is performed on the operation trigger control in the rotation operation subregion, the pose of the lens is adjusted according to the second swipe operation and the plane where the lens is located. When the first swipe operation is performed on the operation trigger control in the translation operation subregion, the pose of the lens is adjusted according to the first swipe operation and the plane where the lens is located. Further, a picture of a scene content in a game scene control is captured by using the pose-adjusted lens to obtain a second captured picture and display the second captured picture on the terminal screen.

In the foregoing process, the operation trigger control is operated in the translation operation subregion and/or the rotation operation subregion, so as to translate or rotate the lens in the plane where the lens is located, which provides a new lens adjustment mode and is convenient for users to operate the game application. In addition, the adjustment to the pose of the lens is performed in the plane where the lens is located, rather than based on an absolute position of the lens in the game scene space, thereby ensuring the accuracy of lens adjustment.

Figure 10:
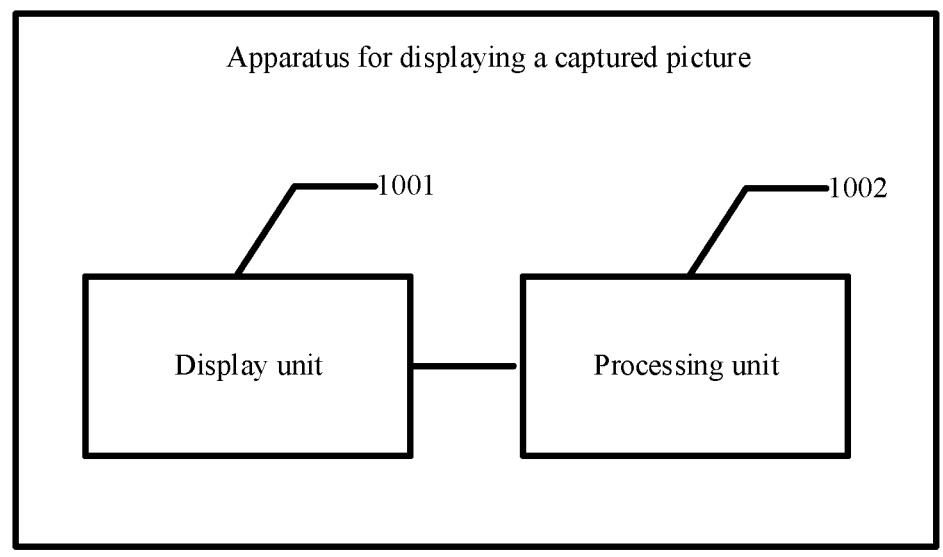
FIG. 10 is a schematic structural diagram of an apparatus for displaying a captured picture according to an embodiment of this application.

Based on the embodiments of the method for displaying a captured picture, an embodiment of this application further provides an apparatus for displaying a captured picture. FIG. 10 is a schematic structural diagram of an apparatus for displaying a captured picture according to an embodiment of this application. The apparatus for displaying a captured picture shown in FIG. 10 may run the following units.

A display unit 1001 is configured to display, on a graphical interface on a terminal screen, a first captured picture of a game scene in a capturing mode in a game application, and display a lens operation control in the first captured picture.

A processing unit 1002 is configured to receive a touch operation performed by a user on the lens operation control.

The display unit 1001 is further configured to display a second captured picture in response to the touch operation, the second captured picture being obtained by adjusting a pose of a lens within a plane where the lens is located based on the touch operation and capturing a picture of the game scene of the game application with the pose-adjusted lens, and the plane where the lens is located being a plane that is perpendicular to an orientation of the lens.

In an embodiment, the lens operation control includes a lens translation sub-control and a lens rotation sub-control. The touch operation includes any one or more of a drag operation performed on the lens translation sub-control in a moving region on the lens operation control corresponding to the lens translation sub-control or a swipe operation performed on the lens rotation sub-control.

In an embodiment, the lens translation sub-control is a solid circle, and the lens rotation sub-control is a hollow annulus. When no drag operation is performed on the lens translation sub-control, a center of a circle of the lens translation sub-control coincides with a center of a circle of the lens rotation sub-control.

In an embodiment, the lens operation control includes an operation region and an operation trigger control. The operation region includes a translation operation subregion and a rotation operation subregion. The touch operation includes any one or more of a first swipe operation performed on the operation trigger control in the translation operation subregion or a second swipe operation performed on the operation trigger control in the rotation operation subregion.

In an embodiment, the operation region is a hollow annulus, and the operation trigger control is a solid circle. An inner circle region in the hollow annulus is the translation operation subregion, and a non-overlapping region between an outer circle region and the inner circle region in the hollow annulus is the rotation operation subregion. When the first swipe operation and the second swipe operation are not performed, the operation trigger control is located in the translation operation subregion, and a center of a circle of the operation trigger control coincides with a center of a circle of the operation region.

In an embodiment, when the touch operation is the second swipe operation, during the adjustment to the pose of the lens based on the touch operation and the plane where the lens is located, the processing unit 1002 performs the following steps: determining a target angle according to the second swipe operation, and determining a rotation direction according to the second swipe operation; and rotating the orientation of the lens by the target angle in the rotation direction based on a perpendicular bisector of the plane where the lens is located.

In an embodiment, during determination of the target angle according to the second swipe operation, the processing unit 1002 performs the following operations: acquiring a swipe start point and a swipe end point of the second swipe operation in the rotation operation subregion; determining a first connecting line between the swipe start point and a center point of the rotation operation subregion and a second connecting line between the swipe end point and the center point of the rotation operation subregion; and determining an included angle between the first connecting line and the second connecting line as the target angle.

In an embodiment, during determination of the rotation direction according to the second swipe operation, the processing unit 1002 performs the following steps: acquiring a swipe start point and a swipe end point of the second swipe operation in the rotation operation subregion; determining, when the swipe end point is in a counterclockwise direction of the swipe start point, that the rotation direction is the counterclockwise direction; and determining, when the swipe end point is in a clockwise direction of the swipe start point, that the rotation direction is the clockwise direction.

In an embodiment, when the touch operation is the first swipe operation, during the adjustment to the pose of the lens based on the touch operation and the plane where the lens is located, the processing unit 1002 performs the following operations: establishing a world coordinate system in the game scene space, and acquiring reference position information of the lens in the world coordinate system; establishing a lens coordinate system based on the plane where the lens is located; acquiring a vertical axis conversion parameter; determining a transverse axis conversion parameter and a longitudinal axis conversion parameter according to the first swipe operation; inputting the vertical axis conversion parameter, the transverse axis conversion parameter, the longitudinal axis conversion parameter, and the reference position information into a rule for position conversion between coordinate systems for calculation, to obtain target position information of the lens in the lens coordinate system; and moving, in the lens coordinate system, the lens from a current position to a position indicated by the target position information.

In an embodiment, the transverse axis conversion parameter includes a transverse axis rotation parameter, and the longitudinal axis conversion parameter includes a longitudinal axis rotation parameter. During the determination of the transverse axis conversion parameter and the longitudinal axis conversion parameter according to the first swipe operation, the processing unit 1002 performs the following operations: determining a transverse axis rotation angle and a longitudinal axis rotation angle according to the first swipe operation; inputting the transverse axis rotation angle into a transverse axis rotation parameter calculation rule for calculation to obtain the transverse axis rotation parameter, and inputting the longitudinal axis rotation angle into a longitudinal axis rotation parameter calculation rule for calculation to obtain the longitudinal axis rotation parameter.

In an embodiment, during determination of the transverse axis rotation angle and the longitudinal axis rotation angle according to the first swipe operation, the processing unit 1002 performs the following operations: acquiring, from the lens coordinate system, a target ray representing the orientation of the lens; projecting the target ray onto a plane formed by a longitudinal axis and a vertical axis, and determining an included angle between a ray obtained after projection and the vertical axis as the transverse axis rotation angle; and projecting the target ray onto a plane formed by a transverse axis and a vertical axis, and determining an included angle between a ray obtained after projection and the vertical axis as the longitudinal axis rotation angle.

In an embodiment, the transverse axis conversion parameter further includes a transverse axis translation parameter, and the longitudinal axis conversion parameter further includes a longitudinal axis translation parameter. During the determination of the transverse axis conversion parameter and the longitudinal axis conversion parameter according to the first swipe operation, the following steps are performed: acquiring a transverse axis distance variation and a longitudinal axis distance variation generated by the first swipe operation; and determining the transverse axis translation parameter according to the transverse axis distance variation, and determining the longitudinal axis translation parameter according to the longitudinal axis distance variation.

In an embodiment, the vertical axis conversion parameter includes a vertical axis rotation parameter, and during the acquisition of the vertical axis conversion parameter, the processing unit 1002 performs the following steps: acquiring a vertical axis rotation angle, the vertical axis rotation angle being zero when the second swipe operation is not received, and the vertical axis rotation angle being a target angle determined according to the second swipe operation when the second swipe operation is received; and inputting the vertical axis rotation angle into a vertical axis rotation parameter calculation rule for calculation to obtain the vertical axis rotation parameter.

In an embodiment, the first captured picture further includes a capturing distance adjustment control, and the vertical axis rotation parameter further includes a vertical axis translation parameter. During the acquisition of the vertical axis conversion parameter, the processing unit 1002 performs the following operations: determining that the vertical axis translation parameter of the lens is zero when no adjustment operation is performed on the capturing distance adjustment control; and acquiring, when an adjustment operation is performed on the capturing distance adjustment control, an adjusted position of the capturing distance adjustment control after the adjustment operation is received, and determining a difference between the adjusted position and a position before the adjustment as the vertical axis translation parameter of the lens.

According to an embodiment of this application, each step involved in the method for displaying a captured picture shown in FIG. 2 and FIG. 7 may be performed by each unit in the apparatus for displaying a captured picture shown in FIG. 10.

According to another embodiment of this application, each unit in the apparatus for displaying a captured picture shown in FIG. 10 may be respectively or all combined into one or several other units, or one (some) of the units may further be split into a plurality of small units by functions, which can realize the same operation without affecting the realization of the technical effects of the embodiments of this application. The foregoing units are divided based on logical functions. In practical application, functions of one unit may also be implemented by a plurality of units, or the functions of the plurality of units may be implemented by one unit. In other embodiments of this application, the apparatus for displaying a captured picture may also include other units. In practical application, these functions may also be implemented with the assistance of other units, and may be implemented with the assistance of a plurality of units.

According to another embodiment of this application, a computer program (including program code) capable of performing the steps involved in the corresponding methods shown in FIG. 2 and FIG. 7 may be run on a general-purpose computing device of a computer including processing elements such as a central processing unit (CPU), a random access storage medium (RAM), and a read-only storage medium (ROM), and storage elements, to construct the apparatus for displaying a captured picture shown in FIG. 10 and implement the method for displaying a captured picture in the embodiments of this application. The computer program may be recorded on, for example, a computer-readable storage medium, loaded into the foregoing computing device through the computer-readable storage medium, and run in the computing device.

Figure 11:
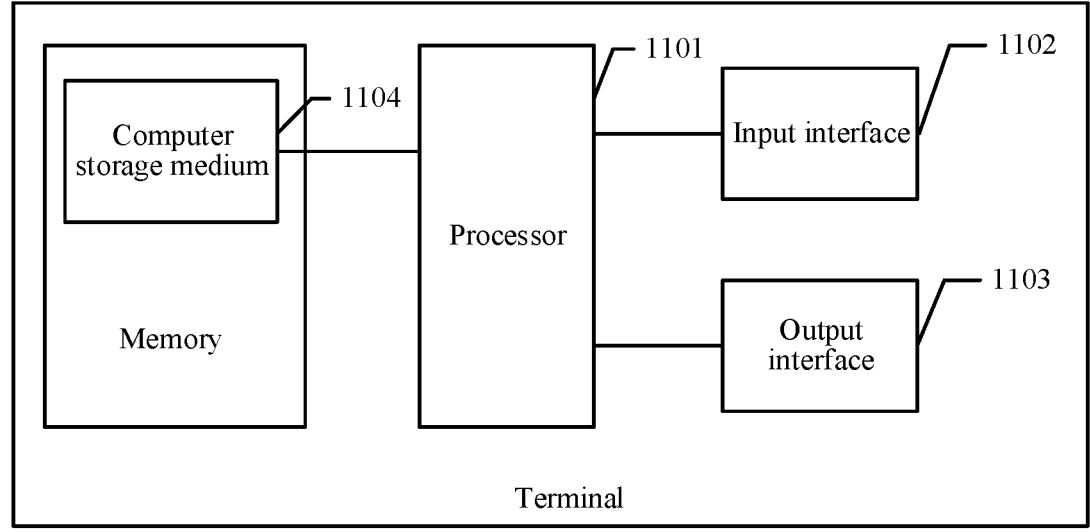
FIG. 11 is a schematic structural diagram of a terminal according to an embodiment of this application.

Based on the foregoing method embodiments and apparatus embodiments, an embodiment of this application provides a terminal. FIG. 11 is a schematic structural diagram of a terminal according to an embodiment of this application. The terminal shown in FIG. 11 may include at least a processor 1101, an input interface 1102, an output interface 1103, and a computer storage medium 1104. The processor 1101, the input interface 1102, the output interface 1103, and the computer storage medium 1104 may be connected by using a bus or in other manners.

The computer storage medium 1104 may be stored in a memory of a text processing device. The computer storage medium 1104 is configured to store a computer program. The computer program includes a program instruction. The processor 1101 is configured to execute the program instruction stored in the computer storage medium 1104. The processor 1101 (or referred to as a central processing unit (CPU)) is a computing core and a control core of the terminal, which is configured to implement one or more instructions, and further configured to load and execute operations of: displaying, on a terminal screen, a first captured picture in a capturing mode in a game application, and displaying a lens operation control in the first captured picture; and displaying a second captured picture in response to a touch operation performed by a user on the lens operation control, the second captured picture being obtained by adjusting a pose of a lens based on the touch operation and a plane where the lens is located and capturing a picture of a scene content in a game scene space with the pose-adjusted lens, the lens being located in the game scene space, and the plane where the lens is located being a plane in the game scene space that is perpendicular to an orientation of the lens.

An embodiment of this application further provides a computer storage medium. The computer storage medium is a memory device in a terminal and is configured to store programs and data. The computer storage medium herein may include an internal storage medium of the terminal and may also include an extended storage medium supported by the terminal. The computer storage medium provides storage space, and the storage space stores an operating system of the terminal. In addition, the storage space further stores one or more instructions adapted to be loaded and executed by the processor 1101. The instructions may be one or more computer programs (including program code). The computer storage medium herein may be a high-speed RAM memory, or may be a non-volatile memory such as at least one magnetic disk storage. In some embodiments, the computer storage medium may be at least one computer storage medium far away from the foregoing processor.

In an embodiment, one or more instructions stored in the computer-readable storage medium may be loaded by the processor 1101, and the processor may execute the one or more instructions stored in the computer storage medium, so as to implement the foregoing corresponding steps of the method for displaying a captured picture shown in FIG. 2 and FIG. 7. During specific implementation, the one or more instructions in the computer storage medium are loaded and executed by the processor 1101 to perform the following steps: displaying, on a terminal screen, a first captured picture in a capturing mode in a game application, and displaying a lens operation control in the first captured picture; and displaying a second captured picture in response to a touch operation performed by a user on the lens operation control, the second captured picture being obtained by adjusting a pose of a lens based on the touch operation and a plane where the lens is located and capturing a picture of a scene content in a game scene space with the pose-adjusted lens, the lens being located in the game scene space, and the plane where the lens is located being a plane in the game scene space that is perpendicular to an orientation of the lens.

According to an aspect of the embodiments of this application, this embodiment of this application further provides a computer product or a computer program is further provided, the computer product or the computer program including computer instructions, the computer instructions being stored in a computer-readable storage medium.

The processor 1101 reads the computer instruction from the computer-readable storage medium. The processor 1101 executes the computer instruction, causing an image processing device to perform the method for displaying a captured picture shown in FIG. 2 and FIG. 7. The method specifically includes: displaying, on a terminal screen, a first captured picture in a capturing mode in a game application, and displaying a lens operation control in the first captured picture; and displaying a second captured picture in response to a touch operation performed by a user on the lens operation control, the second captured picture being obtained by adjusting a pose of a lens based on the touch operation and a plane where the lens is located and capturing a picture of a scene content in a game scene space with the pose-adjusted lens, the lens being located in the game scene space, and the plane where the lens is located being a plane in the game scene space that is perpendicular to an orientation of the lens.

In the embodiment of this application, a first captured picture in a capturing mode in a game application is displayed on the terminal screen, and a lens operation control is displayed in the first captured picture. A second captured picture is displayed in response to a touch operation performed by a user on the lens operation control. The second captured picture is obtained by adjusting a pose of a lens based on the touch operation and a plane where the lens is located and capturing a picture of a scene content in a game scene space with the pose-adjusted lens. In the foregoing process, the pose of the lens is adjusted by performing the touch operation on the lens operation control, so as to take photos at various angles in the game. In addition, the adjustment to the pose of the lens is performed based on the plane where the lens is located, rather than based on the game scene space. The plane where the lens is located is the plane in the game scene space that is perpendicular to the orientation of the lens. It can be seen that the orientation of the lens is taken into account during adjustments to the pose of the lens based on the plane where the lens is located. In this way, the adjustment operation indicated by the touch operation may be consistent with the actual adjustment to the lens, thereby ensuring the accuracy of lens adjustment.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The foregoing disclosure is merely partial embodiments of this application, and certainly is not intended to limit the protection scope of this application. Therefore, equivalent variations made in accordance with the claims of this application shall fall within the scope of this application.

What is claimed is:

1. A method for updating a captured picture in a game application performed by a computer device, the method comprising:

displaying, on a graphical interface, a first captured picture of a game scene of a game application and a lens operation control in the first captured picture, wherein the lens operation control comprises a lens translation sub-control and a lens rotation sub-control;

displaying the lens operation control and a second captured picture in response to a first touch operation performed by a user on the lens operation control, the second captured picture being obtained by (i) mapping the first touch operation to a plane where a lens is located (ii) adjusting a pose of the lens based on the plane where the lens is located and (iii) capturing a picture of the game scene of the game application with the pose-adjusted lens, and the plane where the lens is located being a plane that is perpendicular to an orientation of the lens; and displaying the lens operation control and a third captured picture in response to a second touch operation performed on the lens operation control, the third captured picture obtained by: (i) calculating, according to a position of the second touch operation and a central position of the lens operation control, a moving direction and a moving speed of the lens in the plane where the lens is located (ii) adjusting, according to the moving direction and the moving speed, the position of the lens at a current moment in the plane where the lens is located; and (iii) capturing a picture of the game scene of the game application with the pose-adjusted lens.

2. The method according to claim 1, wherein:

the first touch operation comprises any one or more of a drag operation performed on the lens translation sub-control in a moving region on the lens operation control corresponding to the lens translation sub-control or a swipe operation performed on the lens rotation sub-control.

3. The method according to claim 2, wherein the lens translation sub-control is a solid circle, and the lens rotation sub-control is a hollow annulus; and when no drag operation is performed on the lens translation sub-control, a center of a circle of the lens translation sub-control coincides with a center of a circle of the lens rotation sub-control.

4. The method according to claim 1, wherein the lens operation control comprises an operation region and an operation trigger control, the operation region comprising a translation operation subregion and a rotation operation subregion; and the first touch operation comprises any one or more of a first swipe operation performed on the operation trigger control in the translation operation subregion or a second swipe operation performed on the operation trigger control in the rotation operation subregion.

5. The method according to claim 4, wherein the operation region is a hollow annulus, and the operation trigger control is a solid circle, an inner circle region in the hollow annulus being the translation operation subregion, and a non-overlapping region between an outer circle region and the inner circle region in the hollow annulus being the rotation operation subregion; and when the first swipe operation and the second swipe operation are not performed, the operation trigger control is located in the translation operation subregion, and a center of a circle of the operation trigger control coincides with a center of a circle of the operation region.

6. The method according to claim 4, wherein when the first touch operation is the second swipe operation, the mapping the first touch operation to the plane where the lens is located and adjusting the pose of the lens based on the plane where the lens is located comprises:

determining a target angle according to the second swipe operation, and determining a rotation direction according to the second swipe operation; and rotating the orientation of the lens by the target angle in the rotation direction based on a perpendicular bisector of the plane where the lens is located.

7. The method according to claim 6, wherein the determining the target angle according to the second swipe operation comprises:

acquiring a swipe start point and a swipe end point of the second swipe operation in the rotation operation subregion;

determining a first connecting line between the swipe start point and a center point of the rotation operation subregion and a second connecting line between the swipe end point and the center point of the rotation operation subregion; and determining an included angle between the first connecting line and the second connecting line as the target angle.

8. The method according to claim 6, wherein the determining the rotation direction according to the second swipe operation comprises:

acquiring a swipe start point and a swipe end point of the second swipe operation in the rotation operation subregion;

determining, when the swipe end point is in a counter-clockwise direction of the swipe start point, that the rotation direction is the counterclockwise direction; and determining, when the swipe end point is in a clockwise direction of the swipe start point, that the rotation direction is the clockwise direction.

9. The method according to claim 4, wherein when the first touch operation is the first swipe operation, the mapping the first touch operation to the plane where the lens is located and adjusting the pose of the lens based on the plane where the lens is located comprises:

establishing a world coordinate system in the game application, and acquiring reference position information of the lens in the world coordinate system;

establishing a lens coordinate system based on the plane where the lens is located;

acquiring a vertical axis conversion parameter;

determining a transverse axis conversion parameter and a longitudinal axis conversion parameter according to the first swipe operation;

inputting the vertical axis conversion parameter, the transverse axis conversion parameter, the longitudinal axis conversion parameter, and the reference position information into a rule for position conversion between coordinate systems for calculation, to obtain target position information of the lens in the lens coordinate system; and moving, in the lens coordinate system, the lens from a current position to a position indicated by the target position information.

10. The method according to claim 9, wherein the transverse axis conversion parameter comprises a transverse axis rotation parameter, the longitudinal axis conversion parameter comprises a longitudinal axis rotation parameter, and the determining the transverse axis conversion parameter and the longitudinal axis conversion parameter according to the first swipe operation comprises:

determining a transverse axis rotation angle and a longitudinal axis rotation angle according to the first swipe operation;

inputting the transverse axis rotation angle into a transverse axis rotation parameter calculation rule for calculation to obtain the transverse axis rotation parameter; and inputting the longitudinal axis rotation angle into a longitudinal axis rotation parameter calculation rule for calculation to obtain the longitudinal axis rotation parameter.

11. The method according to claim 10, wherein the determining the transverse axis rotation angle and the longitudinal axis rotation angle according to the first swipe operation comprises:

acquiring, from the lens coordinate system, a target ray representing the orientation of the lens;

projecting the target ray onto a plane formed by a longitudinal axis and a vertical axis, and determining an included angle between a ray obtained after projection and the vertical axis as the transverse axis rotation angle; and projecting the target ray onto a plane formed by a transverse axis and a vertical axis, and determining an included angle between a ray obtained after projection and the vertical axis as the longitudinal axis rotation angle.

12. The method according to claim 9, wherein the transverse axis conversion parameter comprises a transverse axis translation parameter, the longitudinal axis conversion parameter comprises a longitudinal axis translation parameter, and the determining the transverse axis conversion parameter and the longitudinal axis conversion parameter according to the first swipe operation comprises:

acquiring a transverse axis distance variation and a longitudinal axis distance variation generated by the first swipe operation;

determining the transverse axis translation parameter according to the transverse axis distance variation; and determining the longitudinal axis translation parameter according to the longitudinal axis distance variation.

13. The method according to claim 9, wherein the vertical axis conversion parameter comprises a vertical axis rotation parameter, and the acquiring the vertical axis conversion parameter comprises:

acquiring a vertical axis rotation angle, the vertical axis rotation angle being zero when the second swipe operation is not received, and the vertical axis rotation angle being a target angle determined according to the second swipe operation when the second swipe operation is received; and inputting the vertical axis rotation angle into a vertical axis rotation parameter calculation rule for calculation to obtain the vertical axis rotation parameter.

14. The method according to claim 9, wherein the first captured picture further comprises a capturing distance adjustment control, the vertical axis conversion parameter comprises a vertical axis translation parameter, and the acquiring the vertical axis conversion parameter comprises:

determining that the vertical axis translation parameter is zero when no adjustment operation is performed on the capturing distance adjustment control; and acquiring, when an adjustment operation is performed on the capturing distance adjustment control, an adjusted position of the capturing distance adjustment control after the adjustment operation is received, and determining a difference between the adjusted position and a position before the adjustment as the vertical axis translation parameter.

15. The method according to claim 1, wherein the orientation of the lens is not in a horizontal orientation in the game scene.

16. A computer device, comprising:

a processor, adapted to execute one or more instructions; and a computer-readable storage medium, storing one or more instructions, the one or more instructions being adapted to be loaded and executed by the processor to cause the computer device to implement a method for updating a captured picture in a game application including:

displaying, on a graphical interface, a first captured picture of a game scene of a game application and a lens operation control in the first captured picture, wherein the lens operation control comprises a lens translation sub-control and a lens rotation sub-control;

displaying the lens operation control and a second captured picture in response to a first touch operation performed by a user on the lens operation control, the second captured picture being obtained by (i) mapping the first touch operation to a plane where a lens is located (ii) adjusting a pose of the lens based on the plane where the lens is located, and (iii) capturing a picture of the game scene of the game application with the pose-adjusted lens, and the plane where the lens is located being a plane that is perpendicular to an orientation of the lens; and displaying the lens operation control and a third captured picture in response to a second touch operation performed on the lens operation control, the third captured picture obtained by: (i) calculating, according to a position of the second touch operation and a central position of the lens operation control, a moving direction and a moving speed of the lens in the plane where the lens is located (ii) adjusting, according to the moving direction and the moving speed, the position of the lens at a current moment in the plane where the lens is located; and (iii) capturing a picture of the game scene of the game application with the pose-adjusted lens.

17. The computer device according to claim 16, wherein: the first touch operation comprises any one or more of a drag operation performed on the lens translation sub-control in a moving region on the lens operation control corresponding to the lens translation sub-control or a swipe operation performed on the lens rotation sub-control.

18. The computer device according to claim 16, wherein the lens operation control comprises an operation region and an operation trigger control, the operation region comprising a translation operation subregion and a rotation operation subregion; and the first touch operation comprises any one or more of a first swipe operation performed on the operation trigger control in the translation operation subregion or a second swipe operation performed on the operation trigger control in the rotation operation subregion.

19. The computer device according to claim 18, wherein the operation region is a hollow annulus, and the operation trigger control is a solid circle, an inner circle region in the hollow annulus being the translation operation subregion, and a non-overlapping region between an outer circle region and the inner circle region in the hollow annulus being the rotation operation subregion; and when the first swipe operation and the second swipe operation are not performed, the operation trigger control is located in the translation operation subregion, and a center of a circle of the operation trigger control coincides with a center of a circle of the operation region.

20. A non-transitory computer-readable storage medium, storing a computer program instruction, the computer program instruction, when executed by a processor of a computer device, causing the computer device to implement a method for updating a captured picture in a game application including:

displaying, on a graphical interface, a first captured picture of a game scene of a game application and a lens operation control in the first captured picture;

displaying the lens operation control and a second captured picture in response to a first touch operation performed by a user on the lens operation control, the second captured picture being obtained by (i) mapping the first touch operation to a plane where a lens is located (ii) adjusting a pose of the lens based on the plane where the lens is located, and (iii) capturing a picture of the game scene of the game application with the pose-adjusted lens, and the plane where the lens is located being a plane that is perpendicular to an orientation of the lens; and displaying the lens operation control and a third captured picture in response to a second touch operation performed on the lens operation control, the third captured picture obtained by: (i) calculating, according to a position of the second touch operation and a central position of the lens operation control, a moving direction and a moving speed of the lens in the plane where the lens is located (ii) adjusting, according to the moving direction and the moving speed, the position of the lens at a current moment in the plane where the lens is located; and (iii) capturing a picture of the game scene of the game application with the pose-adjusted lens.

* * * * *